United States Patent [19]

Murray

[11] Patent Number: 4,638,875

[45] Date of Patent: Jan. 27, 1987

[54] BLENDING SYSTEM WEIGHING UNIT

[75] Inventor: William R. Murray, Gastonia, N.C.

[73] Assignee: Fiber Controls Corp., Gastonia, N.C.

[21] Appl. No.: 685,482

[22] Filed: Dec. 24, 1984

[51] Int. Cl.$^4$ .................... G01G 19/00; G01G 19/52; G01G 23/18; G01G 19/22

[52] U.S. Cl. ......................................... 177/1; 177/45; 177/50; 177/70; 177/114; 177/187

[58] Field of Search ..................... 177/45, 50, 70, 114, 177/165, 104, 63, 68, 25, 1, 184, 187, 255

[56] References Cited

U.S. PATENT DOCUMENTS

| Re. 25,609 | 6/1964 | Lytton et al. | 177/80 |
| 2,995,783 | 8/1961 | Lytton | 19/69 |
| 3,111,857 | 11/1963 | Lytton | 74/230.17 |
| 3,132,709 | 5/1964 | Lytton | 177/114 |
| 3,142,348 | 7/1964 | Lytton | 177/114 |
| 3,196,967 | 7/1965 | Lytton | 177/157 |
| 3,225,848 | 12/1965 | Wise et al. | 177/80 |
| 3,421,659 | 1/1969 | Lytton et al. | 222/55 |
| 3,512,595 | 5/1970 | Laimins | 177/187 |
| 3,659,279 | 4/1972 | Wise | 177/80 X |
| 3,856,097 | 12/1974 | Bartlo et al. | 177/1 |
| 3,918,539 | 11/1975 | Wise | 177/70 X |
| 4,085,850 | 4/1978 | Heltzel | 177/255 X |
| 4,310,060 | 1/1982 | Phillips, Jr. et al. | 177/70 |
| 4,366,872 | 1/1983 | Brunnschweiler et al. | 177/70 X |
| 4,448,272 | 5/1984 | Keller et al. | 177/50 |
| 4,478,301 | 10/1984 | Cochran, Jr. et al. | 177/70 |

FOREIGN PATENT DOCUMENTS 2342023  2/1975  Fed. Rep. of Germany ...... 177/255

Primary Examiner—E. A. Goldberg
Assistant Examiner—Patrick W. Foster
Attorney, Agent, or Firm—Cushman, Darby & Cushman

[57] ABSTRACT

A fiber blending system includes a number of feeders which dump fibers onto a conveyor. Each feeder includes a weigh pan into which fibers are fed. The weigh pan is pivotally mounted to the feeder and counterbalanced. Also connected to the weigh pan is a single load cell which monitors the weight of fibers in the pan. The load cell is connected to the weigh pan by a single wire about which vibration damping is disposed. Once a set weight of fibers has collected in the pan, feeding stops until a dump command is given related to the position of the conveyor. When the conveyor is in the appropriate position, all feeders then dump fibers at their respective set weights. The blending system is controllled by a programmable controller which monitors for three malfunctions. If fibers fail to dump after a dump command is given, if an excessive time occurs during which the pans are filling without reaching the set weight and when a predetermined number of heavy dumps occur, an alarm is generated.

43 Claims, 19 Drawing Figures

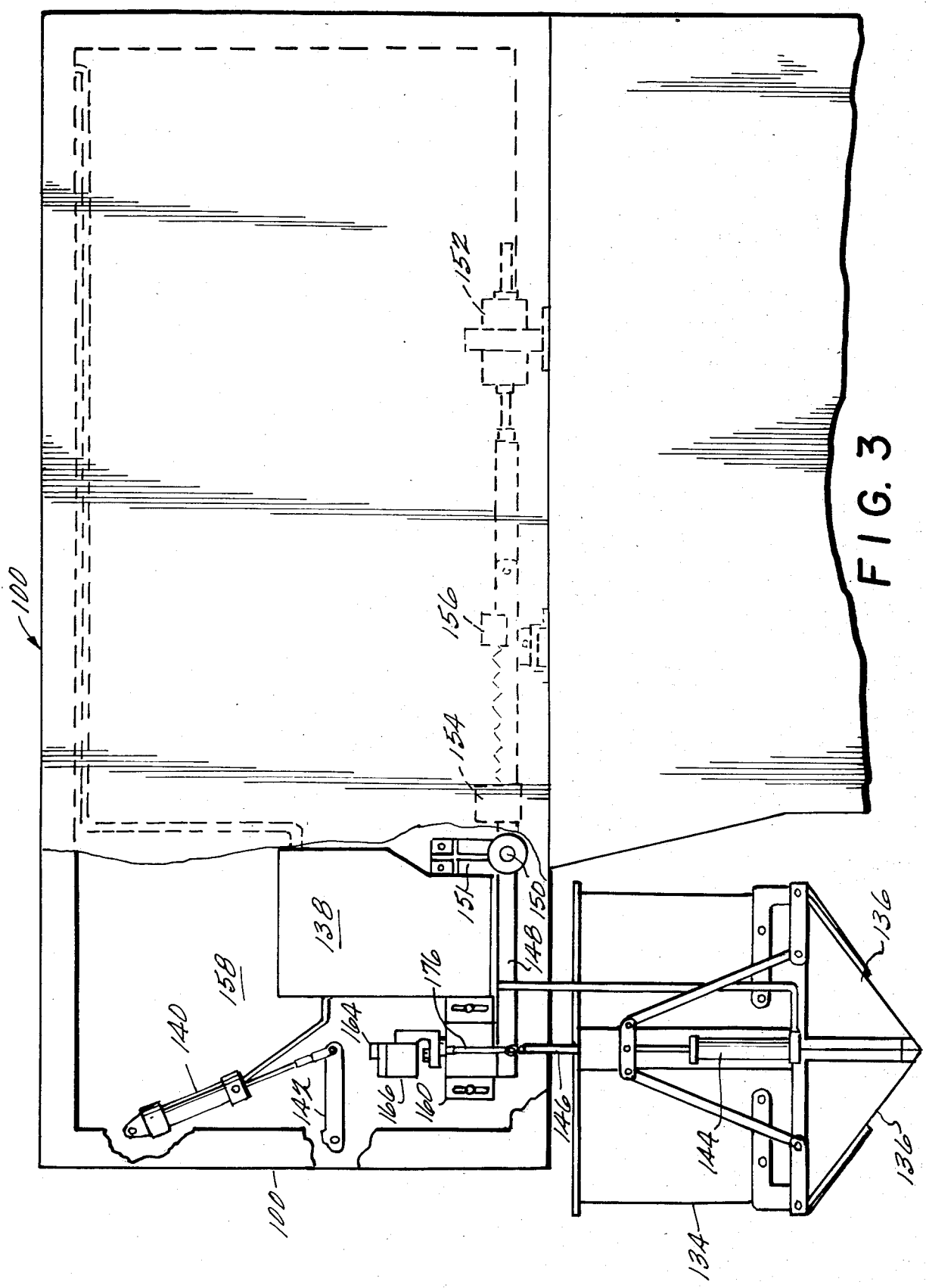

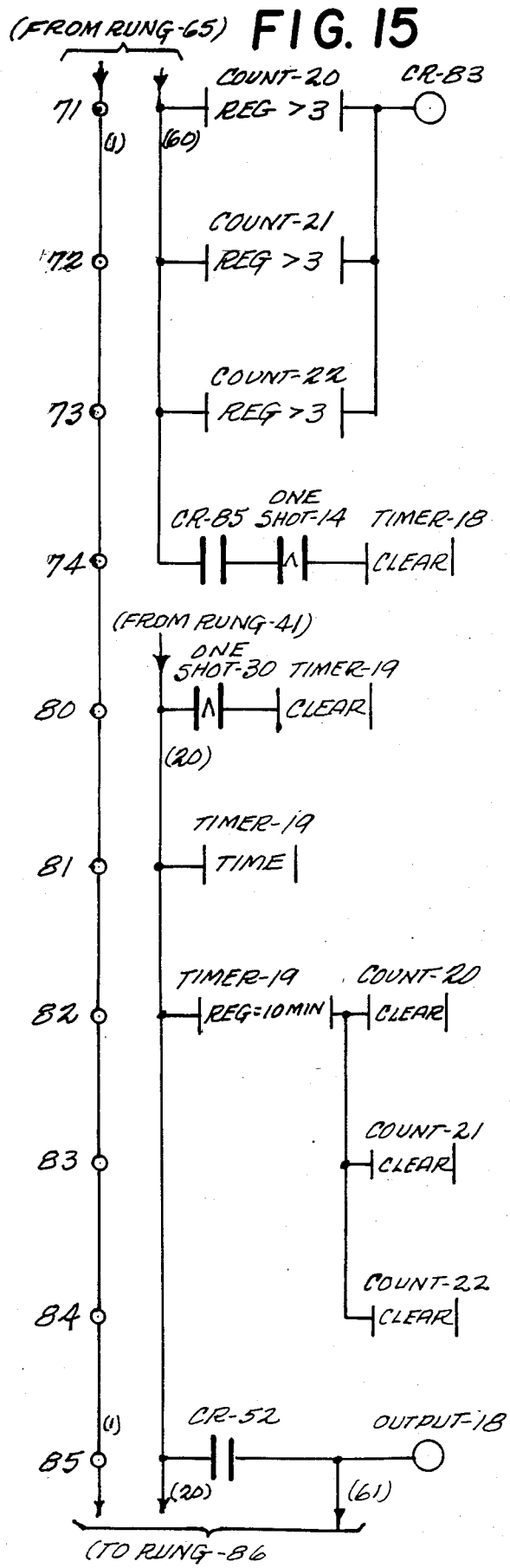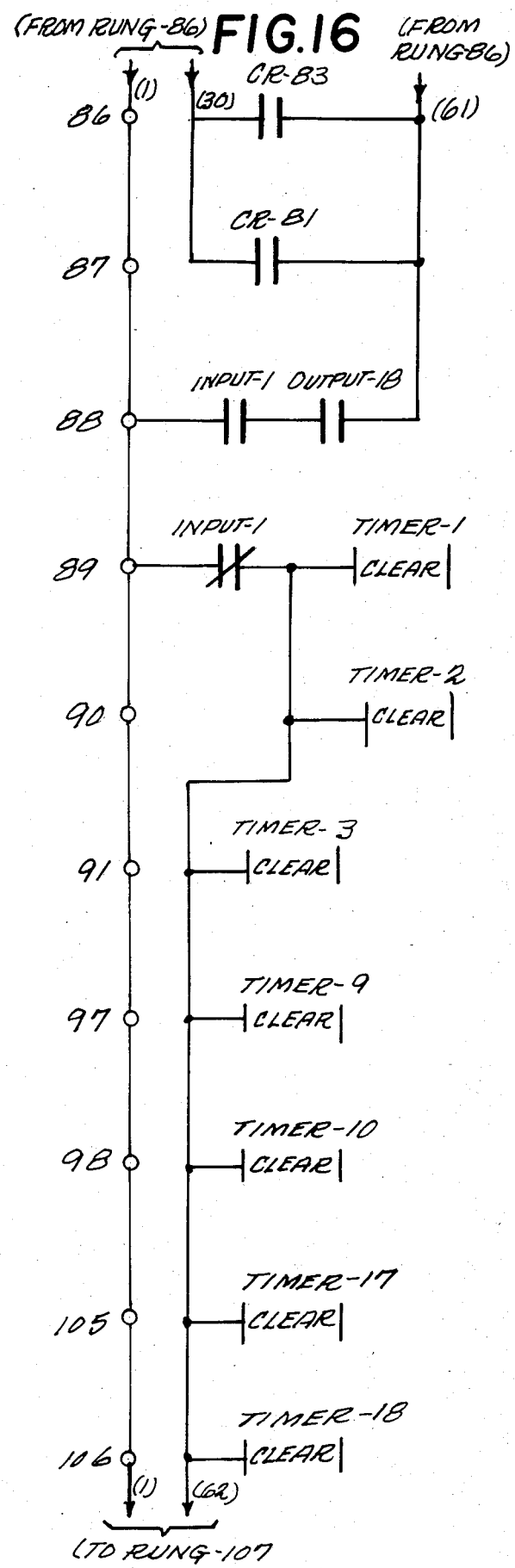

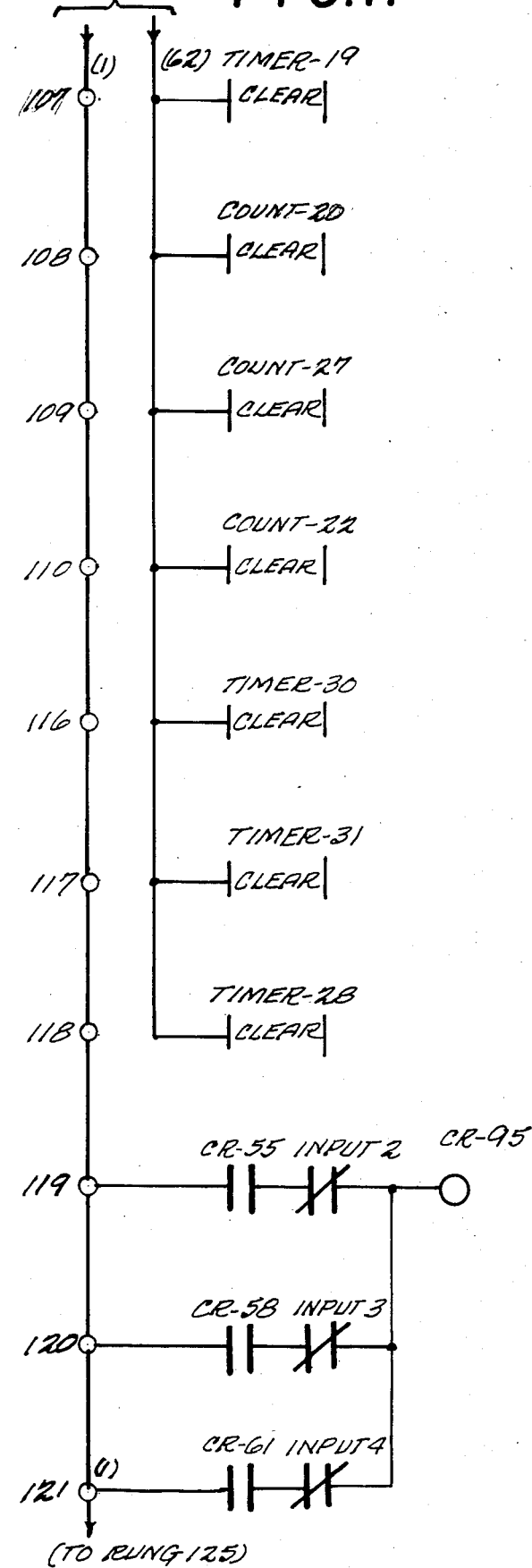
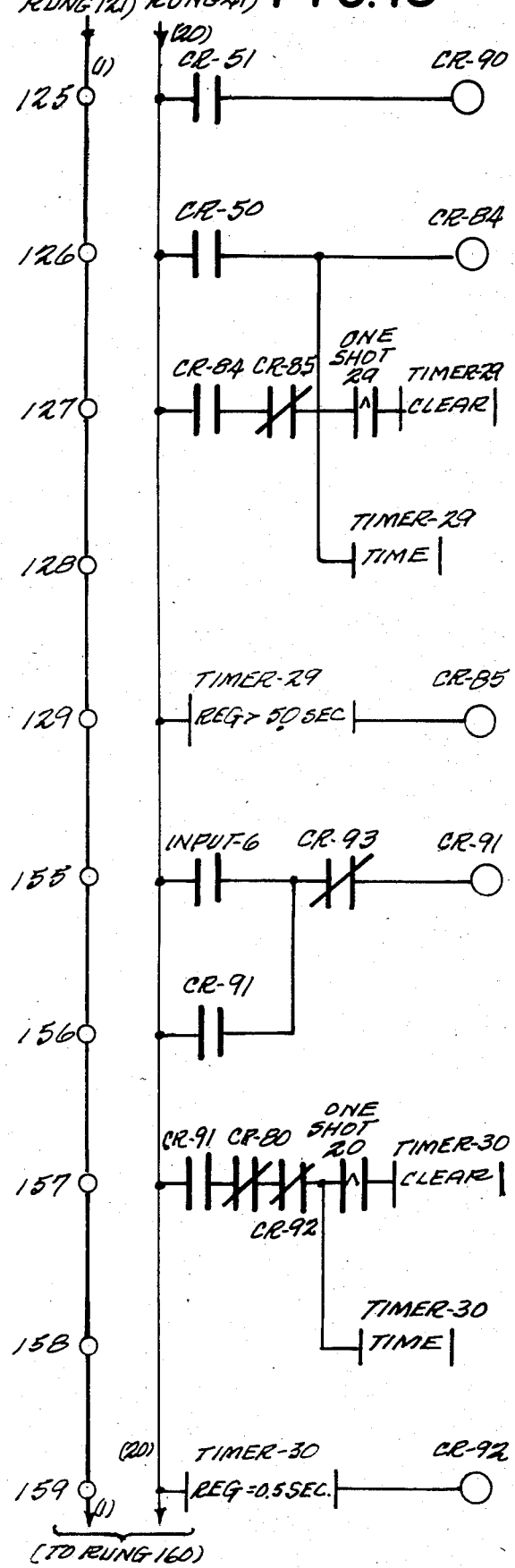
FIG. 17
FIG. 18

BLENDING SYSTEM WEIGHING UNIT

BACKGROUND OF THE INVENTION

1. Field of The Invention

This invention relates to blending selected quantities of different types of fibers. More particularly, this invention relates to aspects of the blending system associated with weighing the different types of fibers.

2. Description of The Prior Art

To blend fibers, it has been well known to provide each different type of fiber in the blend to a different feeder. The feeders separate fibers and gradually accumulate them in a "weigh pan". When a predetermined weight of each type of fiber has been collected in each feeder, the feeders dump those fibers on a conveyor for transporting the fibers to a blender which mixes tne fibers into a more uniform blend. U.S. Pat. No. Re. 25,609 discloses such a blending system.

Typically, cut-off doors control whether fibers may reach the "weigh pan". Once the predetermined weight of fibers has accumulated in each feeder, the cut-off doors for that feeder are actuated to prevent further filling. Then, trap doors associated with the weigh pans for all the feeders open to dump the accumulated fibers on the conveyor. The cut-off doors and trap doors may be operated, for example, by solenoid valves. Examples of such feeders are disclosed in U.S. Pat. No. 3,421,659, 3,142,348, 3,132,709, 3,111,857 and 2,995,783. The feeders in these patents all must weigh fibers that have accumulated in the weigh pan. In these patents and U.S. Pat. No. 3,196,967, specifically directed to a weighing mechanism, the weigh pan is attracted to a magnet. As soon as a sufficient amount of fiber has accumulated in the weigh pan, it breaks away from the magnet, opening the trap doors.

Several features of such a magnetic system make it inconvenient. For example, the weight of fibers at which break-away occurs is controlled by adjusting the distance between a stop against which the weigh pan rests and the magnet. The adjusting process requires numerous fillings of the weigh pan to monitor the breakaway force. This proves to be quite time consuming. Also, the nature of this system is inherently less accurate than might be desired.

The systems in the above-cited patents are electromechanical and do not provide any automatic indication of the proper operation of the apparatus. Generally, mechanical means are employed to synchronize the various elements of the blending system. U.S. Pat. No. 3,225,848 discloses an electrically controlled system which helps to integrate the controlling function. U.S. Pat. No. 3,659,279 discloses an electrical system for monitoring for malfunctions.

To overcome the difficulties associated with employing a magnet to perform the weighing function, it has been known to employ electronic transducers to accomplish the weighing operation. Thus, U.S. Pat. No. 3,918,539 discloses wires to support the weigh pan whose resistance varies with the weight supported. Electronic weighing is also employed in equipment manufactured by Frontier Electronics and Hollingsworth Corp. both of South Carolina.

Systems for monitoring the quantity of fibers dumped by the respective feeders are also, in general, known. An example of such a system is described in U.S. Pat. No. 4,310,060.

SUMMARY OF THE INVENTION

The present invention provides, among other things, a technique of employing an electronic weighing device which enhances system stablility and accuracy. In the present invention, a single electronic weighing device, such as a load cell, may be employed to monitor the weight in the weigh pan. For example, the weigh pan may be attached to a support which is pivotally connected to a housing. Also attached to the support may be a weight to counter-balance the pan. The electronic weighing device may then be connected between the support and the housing. By counterbalancing the weight of the pan, the electronic weighing device monitors only the weight of fibers in the pan, which allows for increased weight monitoring resolution. A digital display may be provided which may selectively indicate the actual weight of fibers in the pan on a continual basis or the dump weight.

It is particularly advantageous that the electronic weighing device not be connected directly to the housing. Instead, it should be mounted displaced from the housing to isolate the electronic weighing device from direct machine vibration. Also, it is advantageous to connect the electronic weighing device to the support through a fine wire. The wire can be chosen so that it breaks before a damaging force is applied to the load cell. Also, it allows the weight of material in the pan to be suspended from one point which allows the machine to use a single load cell. Finally, the wire eliminates all lateral stresses.

A tube may be disposed about the wire connecting the load cell and pan and may be filled with pliable material. This provides damping for vibrations which might effect readings of the electronic weighing device.

Since the electronic weighing device is constantly outputting data concerning the weight of material in the weigh pan, a number of useful features may be incorporated in the weighing system. A dump failure alarm may be provided which indicates that the weight of the weigh pan is still greater than its dump value a predetermined time after a dump should have occurred. Also, an excessive fill time alarm may be provided which indicates that an excessive amount of time has passed since the beginning of filling without the weigh pan reaching its dumping weight. Also, a heavy dump alarm may be provided. When fibers are being weighed, they may be clumped together so that the weight in the pan will suddenly exceed the dump weight by a significant amount. This obviously is undesirable in that it produces a blend other than that desired. A heavy dump alarm may provide an indication when the weight of fiber in the pan at the time of dumping exceeds the dump weight by a predetermined value. In fact, the number of heavy dumps in a predetermined period may be monitored as an indication of a heavy dumping problem. If a weight display is employed it may also selectively display the heavy dump weight.

The preferred embodiment of the blending system of the present invention is controlled by a process controller which includes a microprocessor. As a result, integrated control of the blending system is possible. Thus, in the preferred embodiment of the present invention, it is impossible to stop any component of the blending system without stopping the entire blending system. This protects the integrity of any blending in progress. Also, motors associated with each of the feeders of the blending system are started on a staggered basis to minimize initial current demands.

BRIEF DESCRIPTION OF THE DRAWINGS

These and other objects and advantages of this invention will become more apparent and more readily appreciated from the following detailed description of the presently preferred exemplary embodiment of the invention taken in conjunction with the accompanying drawings, of which:

FIG. 3 is a side elevational view of the feeder of the present invention, partially broken away;

FIGS. 10-19 represent a schematic flow chart of the program operation of the system of FIG. 1.

DETAILED DESCRIPTION OF THE PRESENTLY PREFERRED EXEMPLARY EMBODIMENT

Figure 1:
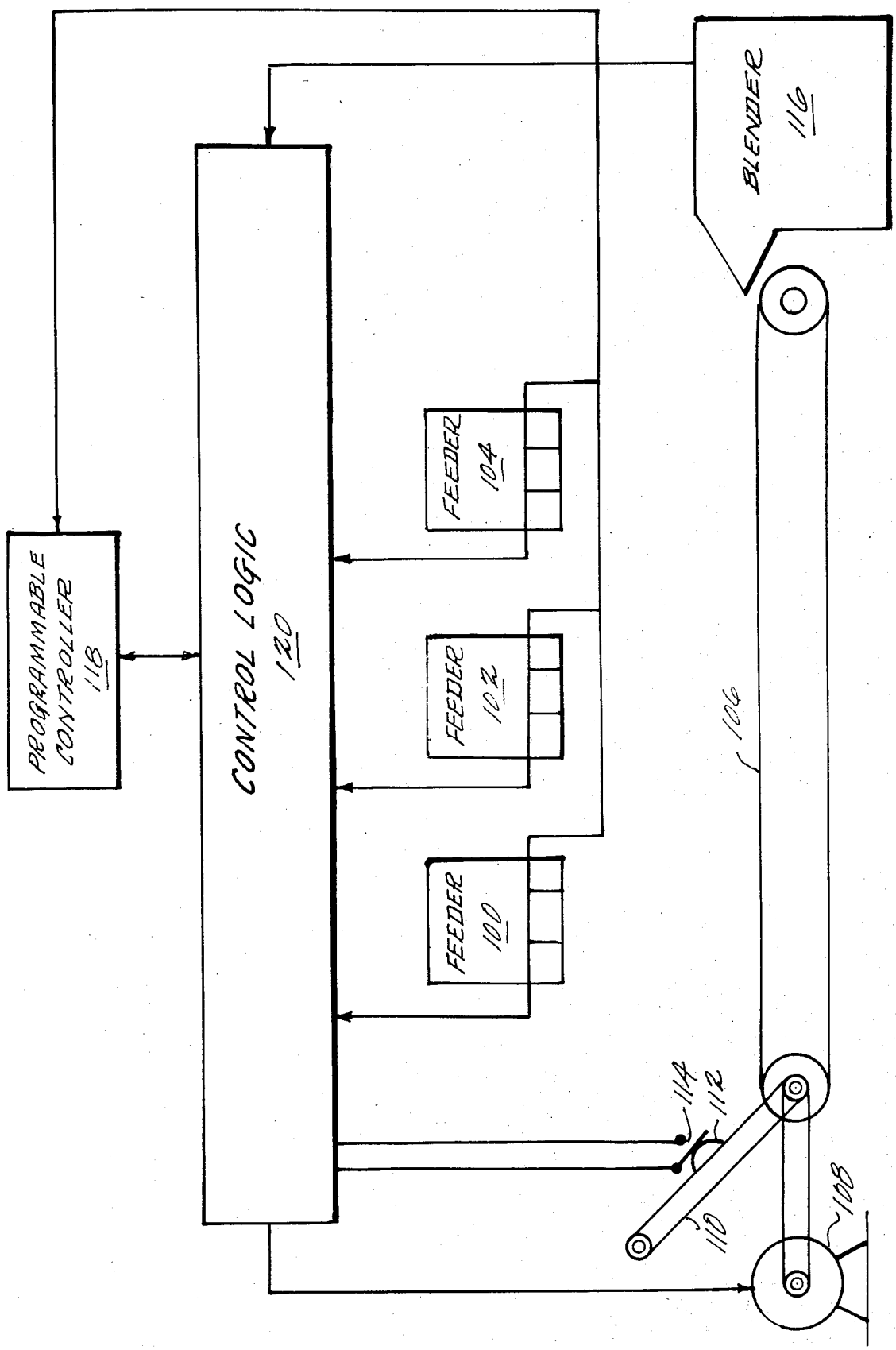
FIG. 1 is a block schematic diagram of a blender system in accordance with the present invention.

Referring to FIG. 1, a blending system in accordance with the present invention includes feeders 100-104. Although three feeders are illustrated in the preferred exemplary embodiment, those skilled in the art will readily appreciate that any number of feeders may be employed, depending upon the number of different fibers desired in a blend. Feeders 100-104 are disposed over a conveyor 106 which is driven by a suitable motor 108. A timing chain 110 including a cam 112 cooperates with dump switch 114 to generate a timing control signal each time conveyor 106 moves a predetermined distance. Conveyor 106 receives fibers from feeders 100-104 which are conveyed to blender 116 or another utilization device.

The operation of feeders 100-104 and conveyor motor 108 are controlled by a conventional programmable controller (PC) 118 in cooperation with suitable control logic 120. Programmable controller 118 is suitably a Cutler Hammer model MPC-1 programmable controller. With 3 feeders, programmable controller 20 employs 11 input terminals and 9 output terminals. When activated, the output terminals of programmable controller 118 generate 115 V.A.C. output signals. The input terminals detect the presence or absence of 115 V.A.C. As will be more fully explained in conjunction with FIGS. 10-19, programmable controller 118 maintains an operating program memory and generates output signals to effect operation of feeders 100-104 and conveyor motor 108 in a controlled sequence in accordance with input signals from control logic 120.

Figure 2:
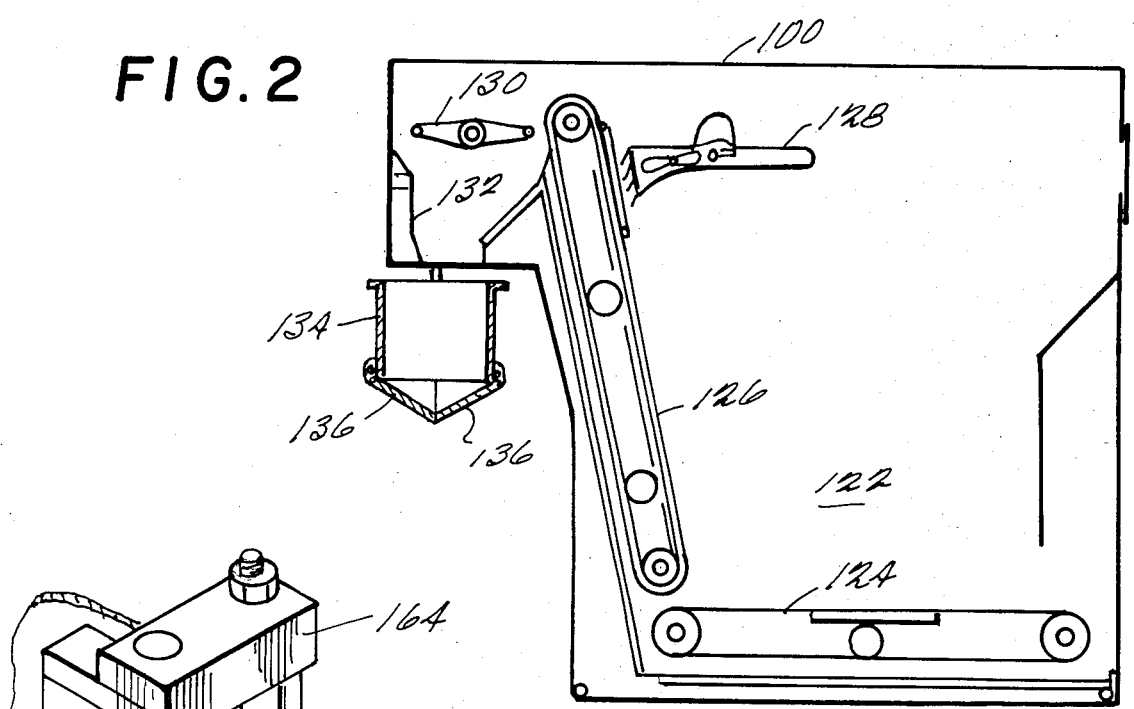
FIG. 2 is a schematic sectional view of a feeder in accordance with the present invention.

An exemplary feeder is illustrated in FIGS. 2-6. Only a single feeder is illustrated since all three feeders are identical. As illustrated in FIG. 2, fibers are placed in area 122 of feeder 100. When feeder 100 is energized, fibers are carried by belts 124 and 126 past comb 128 and doffer 130. Fibers then pass through cutoff door 132 to weigh pan 134. Weigh pan 134 is equipped with trap doors 136 which may be opened to release fibers in weigh pan 134.

As illustrated in FIG. 3, cut-off door 132 and trap doors 136 are pneumatically operated. Thus, pneumatic switch 138 can energize piston 140 which in turn rotates lever 142 to move cut-off door 132. Similarly, switch 138 operates piston 144 to actuate trap doors 136.

FIG. 3 illustrates that one end of weigh pan 134 is connected through rod 146 to support 148. Support 148 is rigidly attached to shaft 150 and the assembly is pivotally mounted by bracket 151 to the frame of feeder 100. Counterweight 152 helps counterbalance the weight of weigh pan 134. To adjust this balance, gross vernier weight 154 and small vernier trim weight 156 are slidably disposed along support 148.

Figure 4:
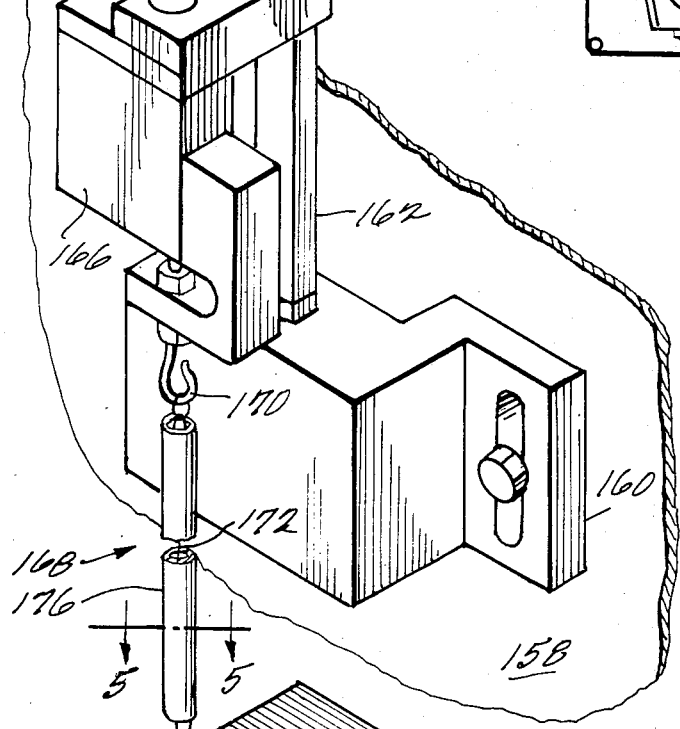
FIG. 4 is a detailed perspective view of the load cell of the present invention.

Attached to panel 158 is adjustable bracket 160. As illustrated in FIG. 4, mounted on bracket 160 is pedestal 162 to which load cell mounting bracket 164 is attached. An electronic weighing device, such as load cell 166, is attached to bracket 164. In the preferred embodiment, load cell 166 is model number SM10 manufactured by Interface Corporation of Scottsdale, Arizona. This load cell can measure between 0 and 10 pounds and has an output which changes by 3 millivolts per pound change hung from load cell 166.

Figure 5:
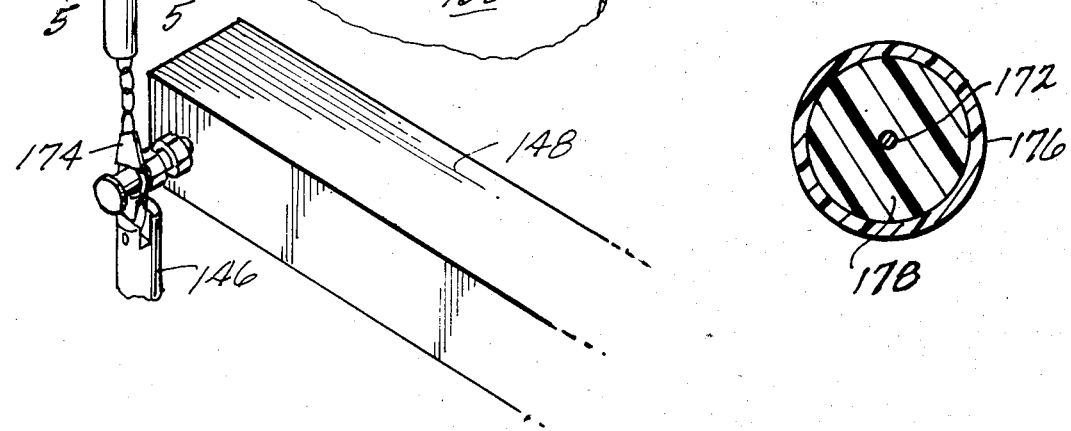
FIG. 5 is a sectional view along the 5—5 line of FIG. 4.

Load cell 166 is connected to support 148 through assembly 168 including bolt 170 connected to load cell 166, wire 172 and pivotal linkage 174. Wire 172 has a 30 pound rating so that if support 148 applies an excessively large force upon load cell 166, wire 172 will break before load cell 166 is damaged. As illustrated in FIGS. 4 and 5, disposed about wire 172 is tube 176. Tube 176 is filled with pliant material 178. In the preferred embodiment, tube 176 is ¼" soft plastic tube and material 178 is RTV silicone rubber manufactured by General Electric.

The particular arrangement for mounting load cell 176 and connecting it to weigh pan 134 produces significant advantages. Since load cell 176 is mounted by a bracket 160, pedestal 162 and bracket 164, rather than being directly attached to panel 158, load cell 166 is isolated from direct machine vibration which can interfere with the output of load cell 166. The use of wire 172 provides a mechanical fuse to prevent load cell 166 from being subjected to excessive force. Also, use of a wire prevents stresses other than weight to eliminate any tendency to bind. As a result of wire 172, the weight of fibers in pan 134 is suspended from one point which allows the use of a single load cell. Plastic tube 176 and silicone rubber 178 damp vibrations to steady the output of load cell 166.

Figure 6:
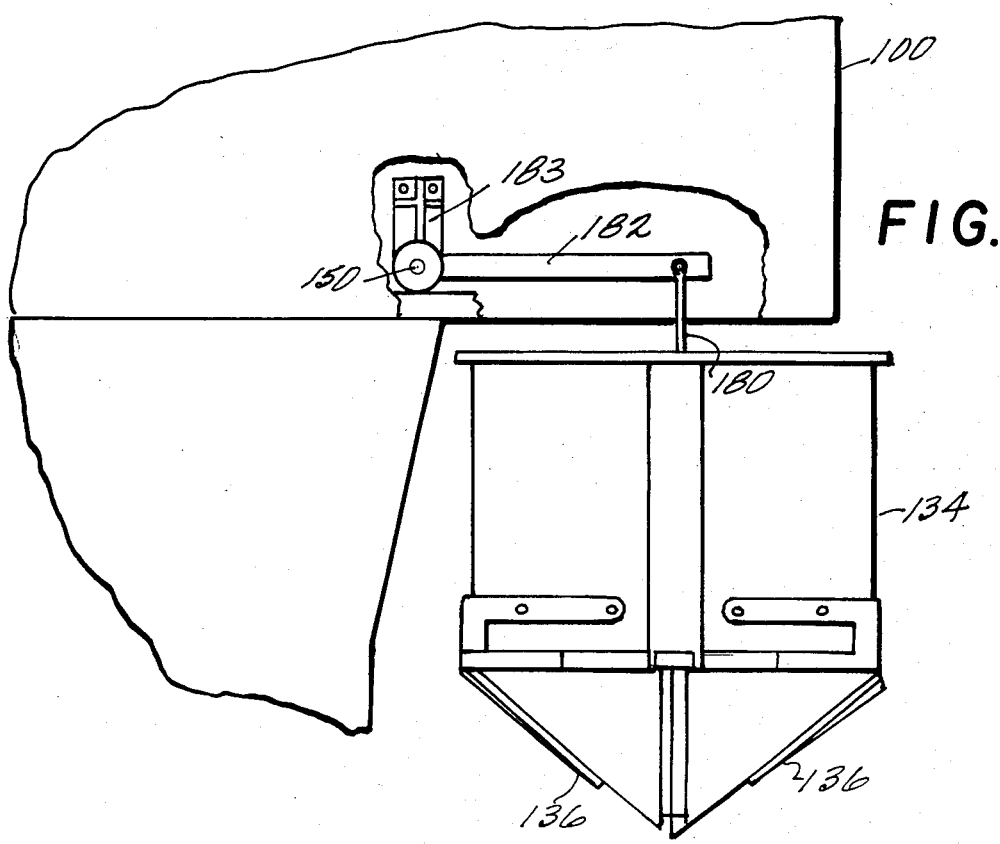
FIG. 6 is a side elevational view of the feeder of the present invention, partially broken away, from the side opposite that illustrated in FIG. 3.

FIG. 6 illustrates the end of pan 134 opposite that illustrated in FIG. 3. The opposite end of pan 134 illustrated in FIG. 6 is connected through rod 180 to support 182. Support 182 is also rigidly attached to shaft 150 and both can pivot about bracket 183. Thus, support 148, shaft 150 and support 182 all pivot as a unit. This combined with the connection by a single wire 172 to load cell 166 allows a single load cell to be employed to measure the weight of fibers in weigh pan 134.

Figure 7:
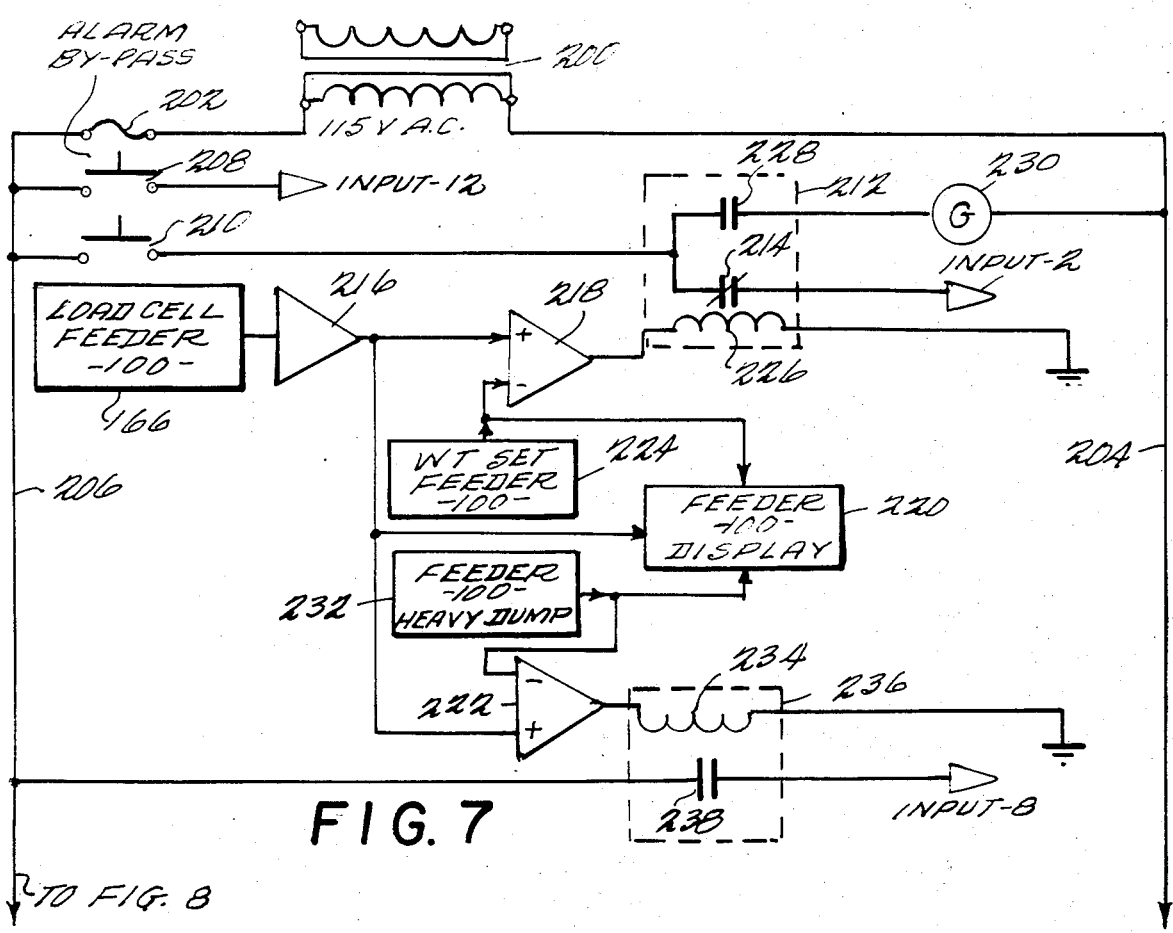
FIGS. 7-9 are schematic diagrams of the circuitry of the system of FIG. 1.
Figure 8:
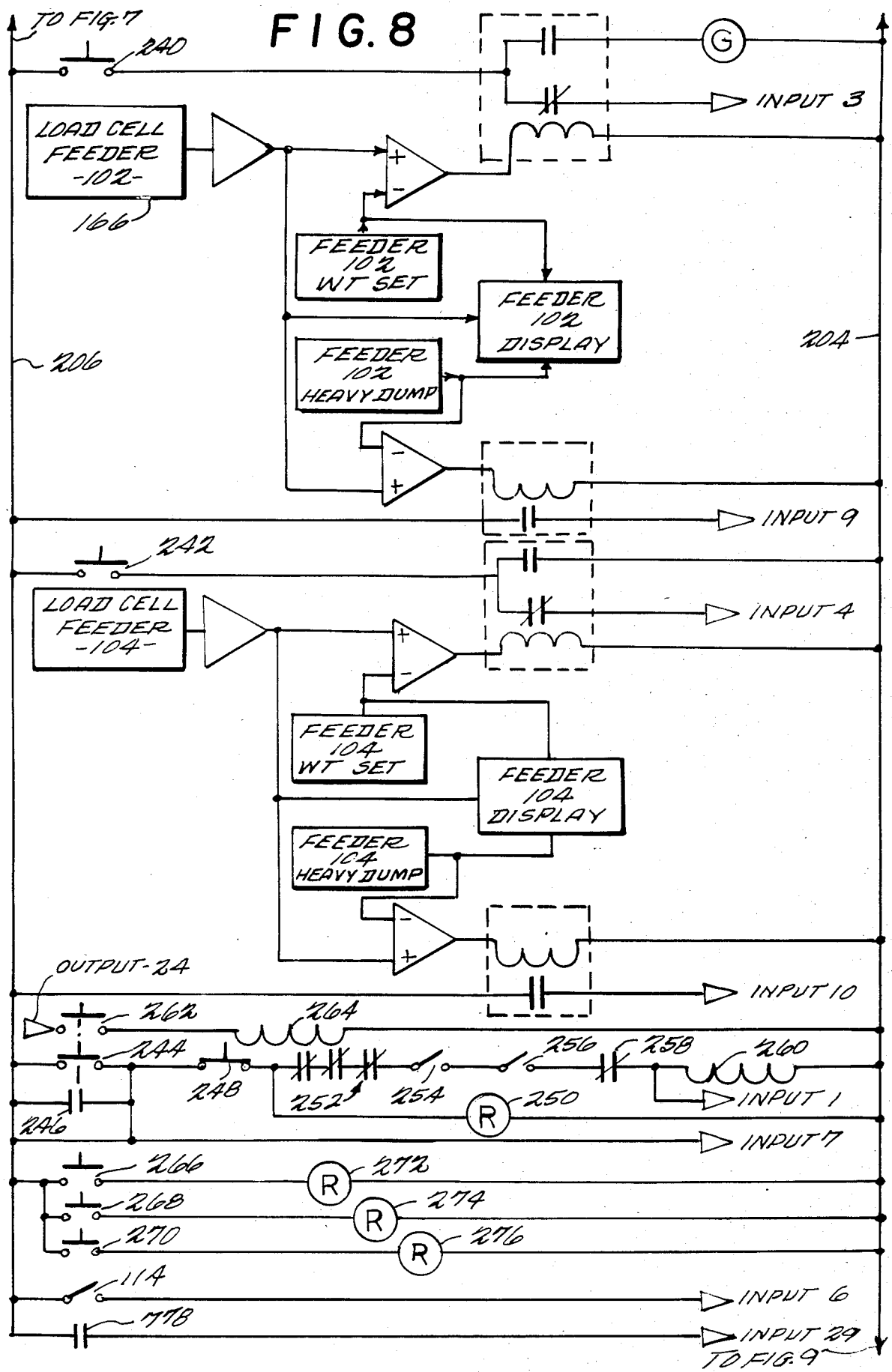
Figure 9:
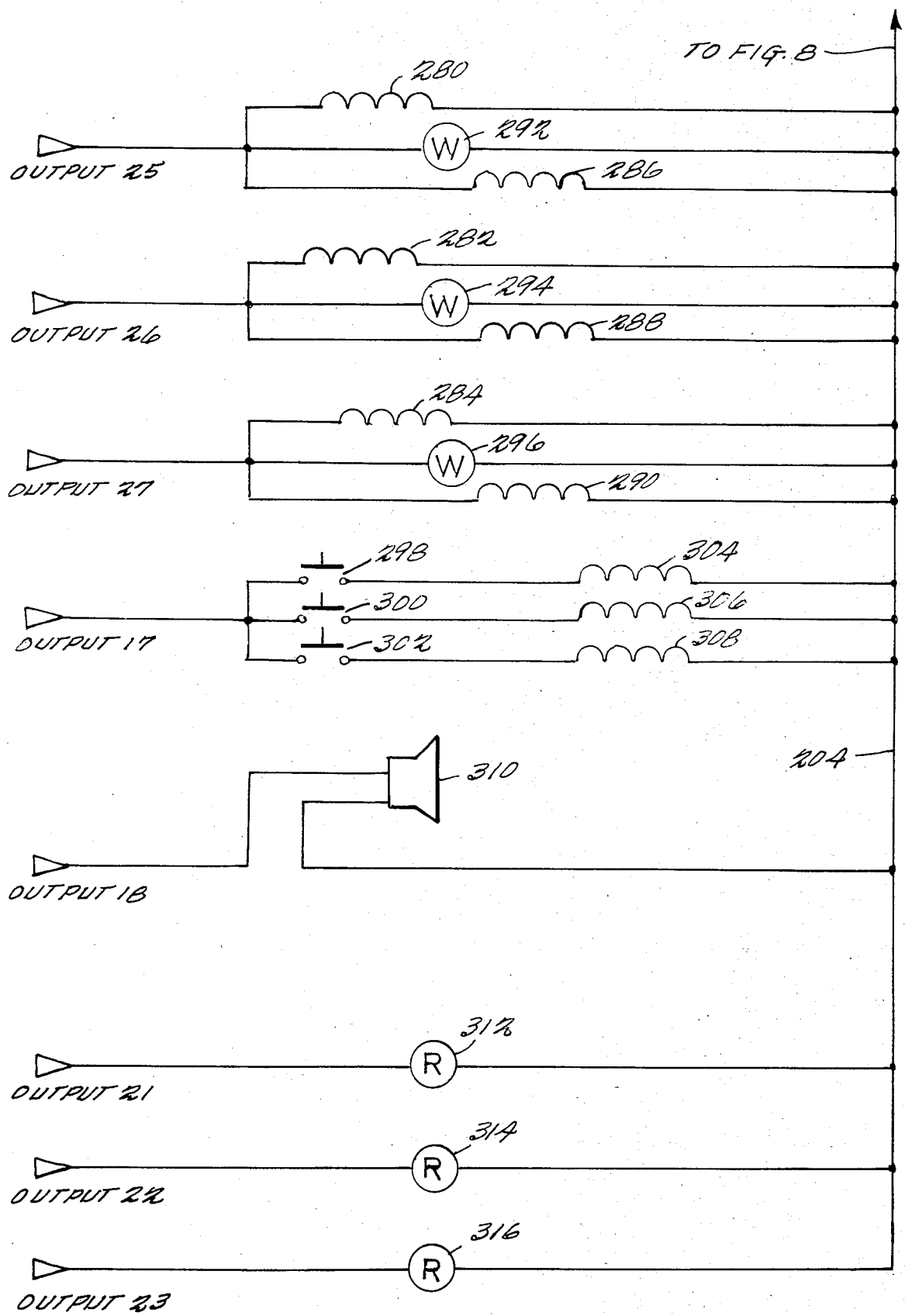

Control logic 120, interfacing between feeders 100-104 and programmable controller 118, is illustrated in FIGS. 7-9. Isolation transformer 200 in FIG. 7 provides 115 V.A.C. through fuse 202 between lines 204 and 206. Connected to "hot" line 206 is alarm bypass switch 208 which, when closed, provides INPUT 12 to programmable controller 118. As will be described below, this switch may be closed to prevent the generation of alarms related to excessive fill time of weigh time 134, no dump of weigh pan 134 and heavy dump of weigh pan 134.

Switch 210 is manually closed when it is desired to select feeder 100 to provide fibers to conveyor 106. Switch 210 is connected between line 206 and form C relay 212. When feeder 100 has been selected by closing switch 210 and pan 134 associated with feeder 100 does not contain the desired weight of fibers, contacts 214 are closed, providing INPUT 2 to programmable controller 118. Thus, INPUT 2 provides an indication to programmable controller 118 that feeder 100 has been selected but fibers therein are not yet at the desired or set weight.

Load cell 166 associated with feeder 100 generates a signal which is amplified by amplifier 216. The output of amplifier 216 is provided to comparator 218, display 220 and comparator 222. Connected to the other input of comparator 218 is weight set voltage generator 224 for feeder 100. Comparator 218 compares a signal from load cell 166 related to the actual weight of fibers in pan 134 with a signal indicative of the desired weight generated by weight set unit 224 to produce an output signal when fibers in weight pan 134 reach a desired weight. The output signal energizes coil 226 of relay 212 to open contacts 214 and close contacts 228. The closing of contacts 228 energizes green light 230 to indicate that feeder 100 is ready to dump.

As a diagnostic tool in monitoring the operation of the blending apparatus according to this invention, it is also possible to monitor the weight of fibers in weigh pan 134 to see whether the weight exceeds a predetermined value greater than the desired weight of fibers. Keep in mind that when fibers reach the desired weight, feeding into pan 134 stops. Therefore, for the higher predetermined weight to be exceeded, it means that fibers are being fed into pan 134 in clumps, which is undesirable. This heavier weight indicative of clumps may be selected with heavy dump setting circuit 232. Circuit 232 provides an output signal indicative of the heavy dump limit to display 220 and comparator 222. Comparator 222 compares the heavy dump limit with the actual weight of fibers in feeder 100 and produces an output signal when the heavy dump limit is exceeded. This output signal energizes coil 234 of relay 236 to close contacts 238. This causes generation of INPUT 8 for programmable controller 118 indicative of a heavy dump by feeder 100.

Circuitry identical to that described above for feeder 100 is also provided for feeders 102 and 104. Thus, in FIG. 8, switch 240 may be closed to select feeder 102. When feeder 102 has been selected and weigh pan 134 associated with feeder 102 does not have sufficient fibers to meet the desired weight, INPUT 3 is provided to programmable controller 118. If the weight of fibers in pan 134 associated with feeder 102 exceeds a heavy dump limit set for feeder 102, INPUT 9 is generated and provided to programmable controller 118. Similarly, switch 242 is closed to select feeder 104. INPUT 4 to programmable controller 118 indicates that feeder 104 has been selected and the weight of fibers in pan 134 associated with feeder 104 has not yet reached the desired set weight. INPUT 10 to programmable controller 118 is provided to indicate that the weight of fibers in pan 134 associated with feeder 104 exceeds the heavy dump limit. Note that both the desired weight and the heavy dump limit may be set independently for each feeder.

To begin operation of the blending system, start switch 244 must be closed. Once start switch 244 is closed, a relay is energized closing contacts 246 to maintain the circuit to which switch 244 is connected active even when switch 244 is released. The closing of switch 244 provides a system enable signal through INPUT 7 of programmable controller 118. Stop switch 248 is normally closed so that the closing of start switch 244 causes illumination of light 250 to indicate that the blending system is on. Connected in series with stop switch 248 are normally closed overload contacts 252, blender safety switch 254, door locks 256 and normally closed blender overload contact 258. If start switch 244 is closed, no overloads exist and all doors and safety switches are closed, coil 260 is energized causing the motor of blender 116 to become energized. At the same time, an indication is provided to programmable controller 118 through INPUT 1 that blender 116 is energized.

Mechanically linked with switch 244 is switch 262. When switch 262 is closed and an output signal from programmable controller 118 is provided through OUTPUT 24, coil 264 causes motor 108 associated with conveyor 106 to operate.

Mechanically interconnected with the switches 210, 240 and 242 are switches 266, 268 and 270, respectively. It will be recalled that these switches are employed to select feeders 100, 102 and 104, respectively. When switch 266, 268 or 270 is closed, red light 272, 274 or 276, respectively, becomes energized indicating that the associated feeder has been selected and will be energized.

In connection with FIG. 1, switch 114 was mentioned as providing timing signals to control the dumping of pans 134 associated with feeders 100, 102 and 104. When cam 112 closes switch 114, a signal is provided to programmable controller 118 through INPUT 6.

Typically, downstream from blender 116 is a storage device which provides some flexibility for the system. Typically, the blending system can feed a blend of fibers to the storage area more quickly than fibers are removed from the storage area. To prevent the storage area from over filling, an electric eye is provided to monitor the level of fibers in the storage area. When the level of fibers in the storage area drop to a certain level, the electric eye causes contacts 278 to close, providing an electric eye call signal to programmable controller 118 through INPUT 29.

As illustrated in FIG. 9, programmable controller 118 controls the energization of motors associated with feeders 100, 102 and 104. When programmable controller 118 commands energization of feeders 100, 102 or 104, an output signal is generated upon OUTPUT 25, 26 or 27, respectively. These output signals respectively energize coil 280, 282 or 284 to start a motor associated with feeder 100, 102 or 104, respectively. At the same time, solenoid 286, 288 or 290 in pneumatic switch 138 (see FIG. 3) associated with feeder 100, 102 or 104 is energized to cause the respective trap door 132 in feeder 100, 102 or 104 to open. Also, white light 292, 294 or 296 is respectively energized indicating that respective feeder 100, 102 or 104 has been energized.

In addition to switches 266, 268 and 270, switches 298, 300 and 302 are also mechanically linked with switches 210, 240 and 242, respectively. Thus, when feeder 100 is selected, switch 298 is closed; when feeder 202 is selected, switch 300 is closed; and when feeder 204 is selected, switch 302 is closed. Programmable controller 118 controls the instant of dumping by applying a signal to OUTPUT 17. When this signal is applied to OUTPUT 17, it passes through any closed one of switches 298, 300 and 302 to energize solenoids 304, 306 and 308, respectively, disposed in pneumatic switch 138 associated with each of feeders 100, 102 and 104, respectively. This causes energization of pistons 144 to open trap doors 136 to cause dumping.

As indicated above, alarms may be generated when: (1) an excessive amount of time is necessary to fill pans 134, (2) it is determined that no dump has occurred from pans 134 or (3) an excessive number of heavy dumps have occurred. When any of the alarms are generated, a signal is produced by programmable controller 118 and applied to OUTPUT 18. This causes alarm 310 to be energized. Also, in the preferred embodiment, lights 312, 314 and 316 become energized when a heavy dump occurs in feeders 100, 102 and 104, respectively. Lights 312, 314 and 316 are energized by signals applied by programmable controller 118 to OUTPUTS 21, 22 and 23, respectively.

Thus, control logic 120 connects a number of inputs and outputs from programmable controller 118 to feeders 100-104 and conveyor 106. A summary of those inputs and outputs, which will be useful in understanding the operation of programmable controller 118, is summarized below in Table 1:

TABLE 1

| Terminal | Functional Significance |
|---|---|
| INPUT 1 | Blender 116 On |
| INPUT 2 | Feeder 100 Selected, Associated Weigh Pan 134 Not Full |
| INPUT 3 | Feeder 102 Selected, Associated Weigh Pan 134 Not Full |
| INPUT 4 | Feeder 104 Selected, Associated Weigh Pan 134 Not Full |
| INPUT 6 | Dump Switch 114 Closed |
| INPUT 7 | System Enable |
| INPUT 8 | Feeder 100 Heavy Dump |
| INPUT 9 | Feeder 102 Heavy Dump |
| INPUT 10 | Feeder 104 Heavy Dump |
| INPUT 12 | Alarm Bypass |
| OUTPUT 17 | Command for Weigh Pans 143 to Dump |
| OUTPUT 18 | System Alarm |
| OUTPUT 21 | Heavy Dump Indication Signal |
| OUTPUT 22 | Excessive Fill Time Indication Signal |
| OUTPUT 23 | Dump Failure Indication Signal |
| OUTPUT 24 | Signal to Cause Conveyor 106 to Operate |
| OUTPUT 25 | Signal to Cause Feeder 100 to Operate |
| OUTPUT 26 | Signal to Cause Feeder 102 to Operate |
| OUTPUT 27 | Signal to Cause Feeder 104 to Operate |
| INPUT 29 | Signal From the Electric Eye Calling for More Blended Fibers |

A number of inputs and outputs of programmable controller 118 are not employed. This allows expansion of the system to include more feeders in the manner that would be logical extension from the description herein for three feeders to those skilled in the art.

Figure 10:
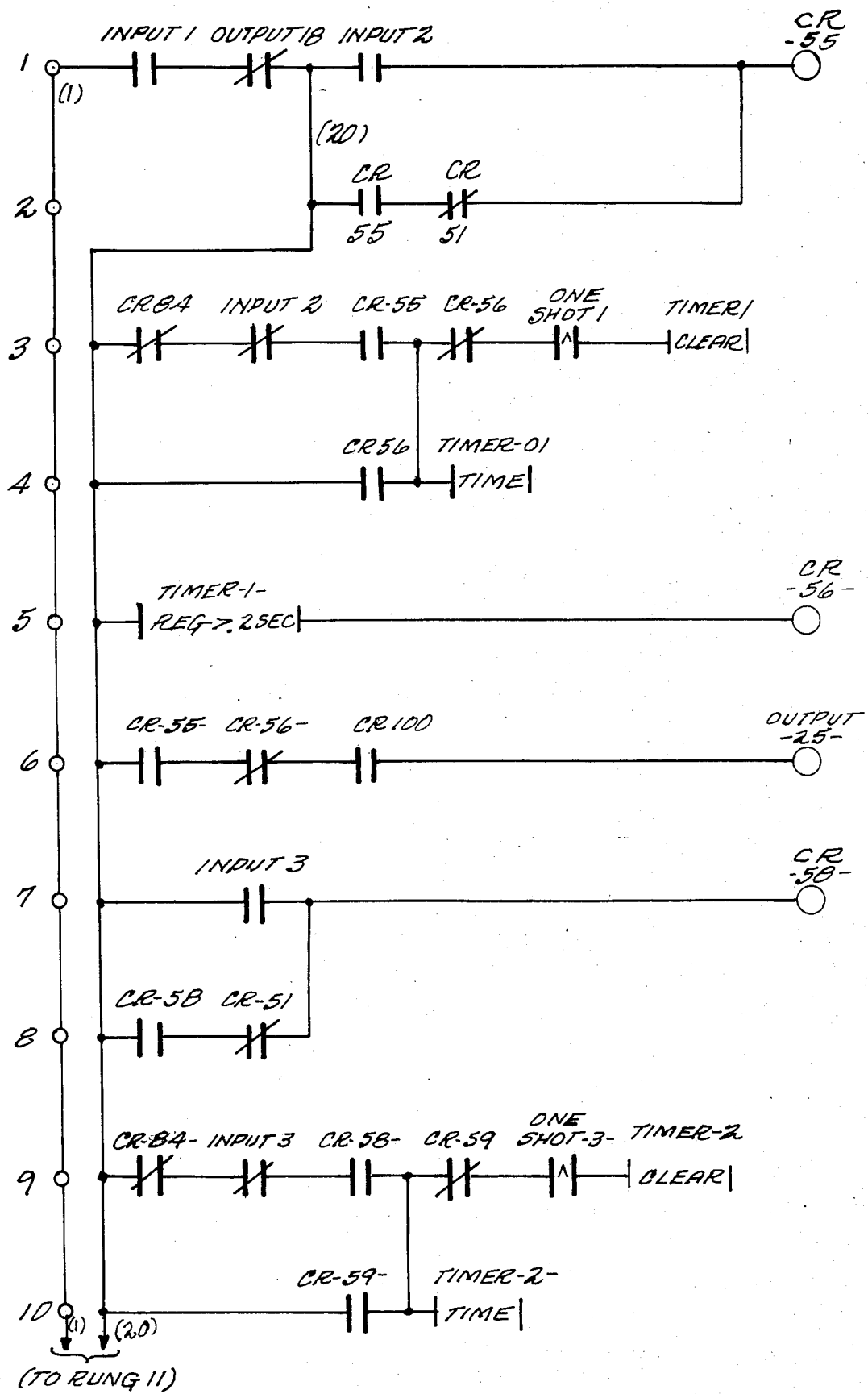
Figure 11:
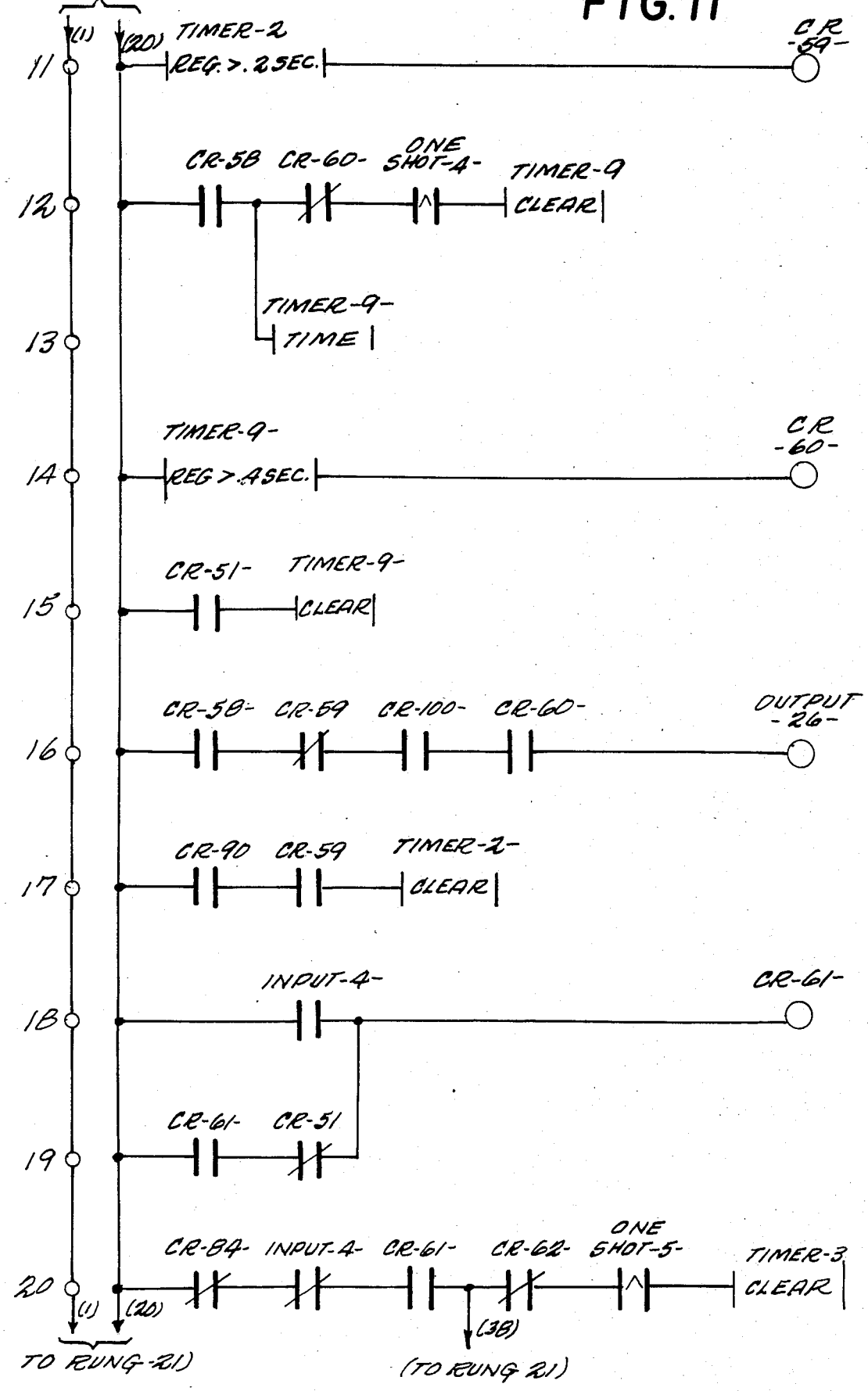
Figure 12:
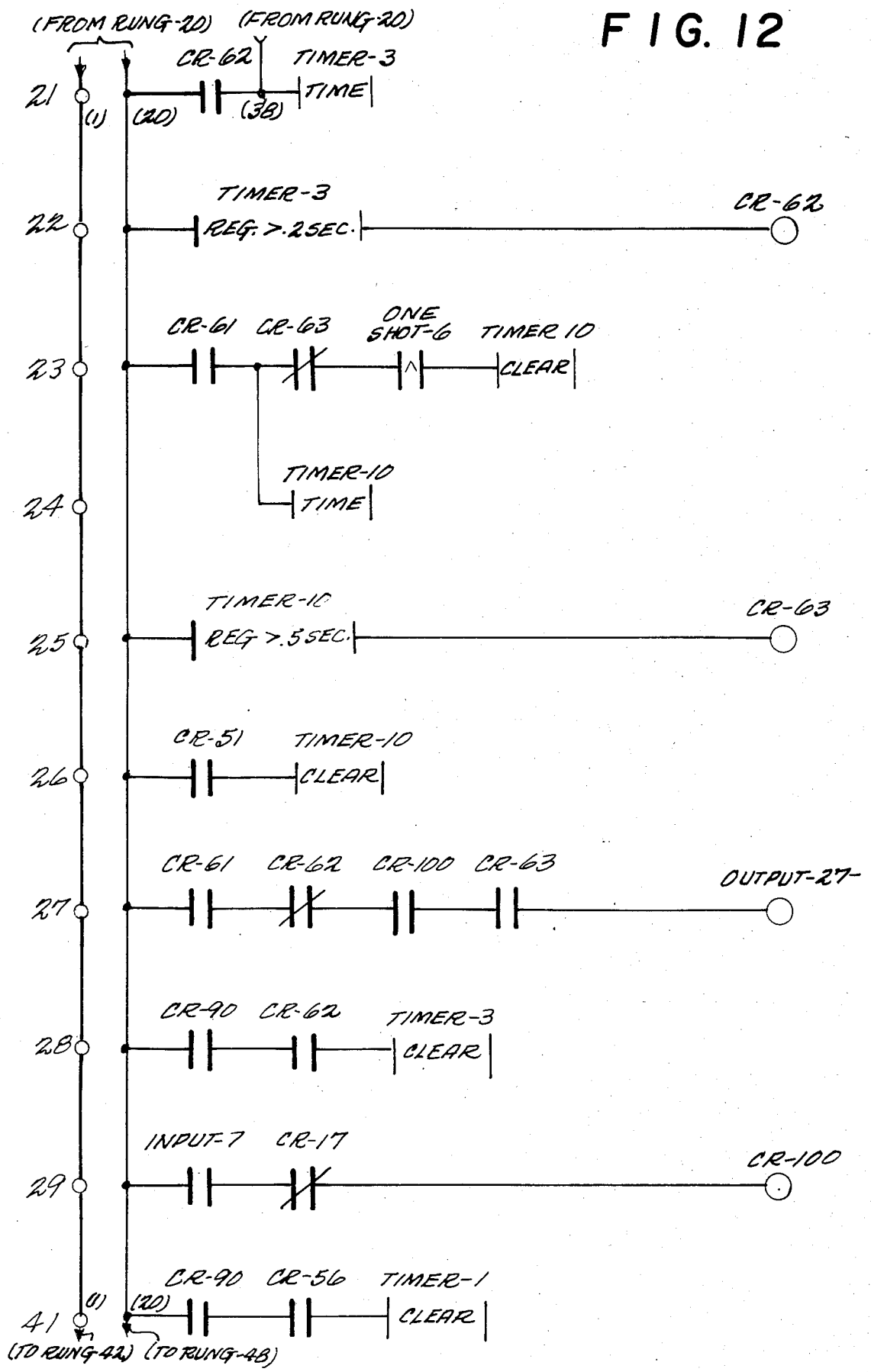

The operation of programmable controller 118, and thus the entire blending system, will now be described with respect to FIGS. 10-19. Referring now to FIG. 10, vertical wire labelled (1) is the main bus and is powered at all times. Referring now to rung 1, INPUT 1 indicates whether blender 116 is energized. If blender 116 is energized, the INPUT 1 contacts are closed. OUTPUT 18 is a system alarm. When the sytem alarm is not being output, the contacts associated with OUTPUT 18 are closed. Thus, if blender 116 is on and no system alarm is being generated, vertical wire (20) becomes energized. If the contacts associated with INPUT 2 are also closed, control relay 55 is energized. The contacts associated with INPUT 2 are closed when feeder 100 has been selected and the weight of fibers in associated weigh pan 134 have not reached the desired value. Thus, control relay 55 is the feeder 100 select latch.

In rung 2, once feeder 100 select latch 55 is energized, the control relay 55 contacts become closed. This causes control relay 55 to remain energized until control relay 51, the dump reset control relay, is energized, opening the contacts associated with the CR51. Thus, control relay 55 becomes energized when feeder 100 is selected and remains energized until the dumping of feeder 100 is completed.

Rungs 3 and 4 are powered by wire (20) when blender 116 is on and no system alarm is being generated. The purpose of rungs 3 and 4 is to clear and then enable timer 1 to begin timing after pan 134 of feeder 100 is full. The intent of rungs 3 and 4, in conjunction with rung 5 is to generate a signal by energizing control relay 56 that feeder 100 is full after INPUT 2 indicates that feeder 100 has caused a full indication to be continuously generated for 0.2 seconds. The 0.2 seconds of waiting insures that a full indication signal will not be generated in response to vibrations or the inertia of fibers falling into pan 134, rather than the actual weight of fibers in pan 134. In rung 3, control relay 84 is usually closed. This is the dump anti-bounce relay which opens when dumping occurs and closes 5 seconds later. However, when hopper 100 is filling, the INPUT 2 contacts are normally opened so that power is not applied to timer 1. Once feeder 100 generates a signal that weigh pan 134 is full, control relay 84 contacts are closed, the INPUT 2 contacts become closed and the control relay 55 contacts have been closed (see rung 1). Control relay 56 is the feeder 100 full relay which, at this point, remains closed so that one-shot 1 produces a pulse which clears timer 1.

In rung 3, the closing of the INPUT 2 contacts causes timer 1 to begin timing in rung 4. In rung 5, once timer 1 has timed 0.2 seconds, control relay 56, indicative of the fact that feeder 100 has stabilized in a full condition, becomes energized. This closes the CR56 contacts in rung 4 so that timer 1 continues to time.

Rungs 3-5 cause data to be input to controller 118 that an operator has selected feeder 100. It is then necessary for programmable controller 118 to control the energization of feeder 100. Thus, in rung 6, once CR55, the feeder 100 select latch, is energized in rung 1, the CR55 contacts close. Since the CR56 contacts will remain closed until feeder 100 is full (see rung 5) and the contacts associated with CR100, the fill system enable latch, will be closed, OUTPUT 25 is generated which causes the motor associated with feeder 100 to be energized. Feeder 100 continues to operate until control relay 56 is energized at rung 5, opening the CR56 contacts in rung 6.

Rungs 1-6 control the filling of pan 134 in feeder 100. Feeders 102 and 104 are controlled in substantially the same manner. Thus, rungs 7-11 correspond with rungs 1-5 except that they relate to feeder 102.

The operation of feeders 100-104 does vary in the manner in which they are energized. Specifically, the starting of feeders 100-104 is staggered to reduce initial current surge. Thus, rung 6 causes feeder 100 to begin operation as soon as feeder 100 is selected. Rungs 12-16 in FIG. 11, control the energization of feeder 102. Thus, in rung 12, once feeder 102 has been selected as indicated by the closing of contacts associated with control relay 58, and control relay 60 remains closed, indicating that it is not yet time for feeder 102 to begin operation (see rung 14), one-shot 4 produces a pulse which clears timer 9. At the same time, the closing of the contacts associated with control relay 58 causes timer 9 to begin timing in rung 13. In rung 14, once timer 9 has counted to 0.4 seconds, control relay 60 is energized, indicating that feeder 100 may begin operation. In rung 15, timer 9 is cleared when the contacts associated with control relay 51, the dump reset latch, become closed. In rung 16, when feeder 102 has been selected and is not yet full, the contacts associated with control relay 58 close. Until feeder 102 becomes full, the contacts associated with control relay 59 remain closed. The contacts associated with control relay 100 close when the fill system is enabled. Therefore, once control relay 60 is energized in rung 14 (indicating that 0.4 seconds have passed since feeder 102 has been selected and enabled), OUTPUT 26 is generated to cause the motor associated with feeder 102 to become operational.

Timer 2 times the 0.2 second interval over which a full signal must be received from feeder 102 before the full latch, CR59 for feeder 102 is set. Rung 17 clears timer 2 when the contacts associated with control relay 90, the fill reset latch and the contacts associated with CR59, the feeder 102 full latch, are closed.

Rungs 18-22 (FIGS. 11 and 12) correspond exactly with rungs 1-5, except controlling the filling of feeder 104. Rungs 23-28 (FIG. 12) correspond exactly with rungs 12-17 except that feeder 104 is delayed 0.5 seconds before the energization of its motor after it has been selected, as opposed to the 0.4 second delay associated with feeder 102 and the instant starting of feeder 100.

Reference has been made in rungs 6, 16 and 27 to control relay 100, the system fill enable relay. Rung 29 causes the system fill enable relay 100 to be energized. Thus, when INPUT 7 is received, indicating that the system has been enabled, and control relay 17 is not enabled so that its contacts are closed, control relay 100 is energized. Control relay 17 causes the contacts to be closed when a dump cycle is not occurring.

Rung 41 causes timer 1 to be cleared in a manner identical to the manner in which rung 17 causes timer 2 to be cleared.

Figure 13:
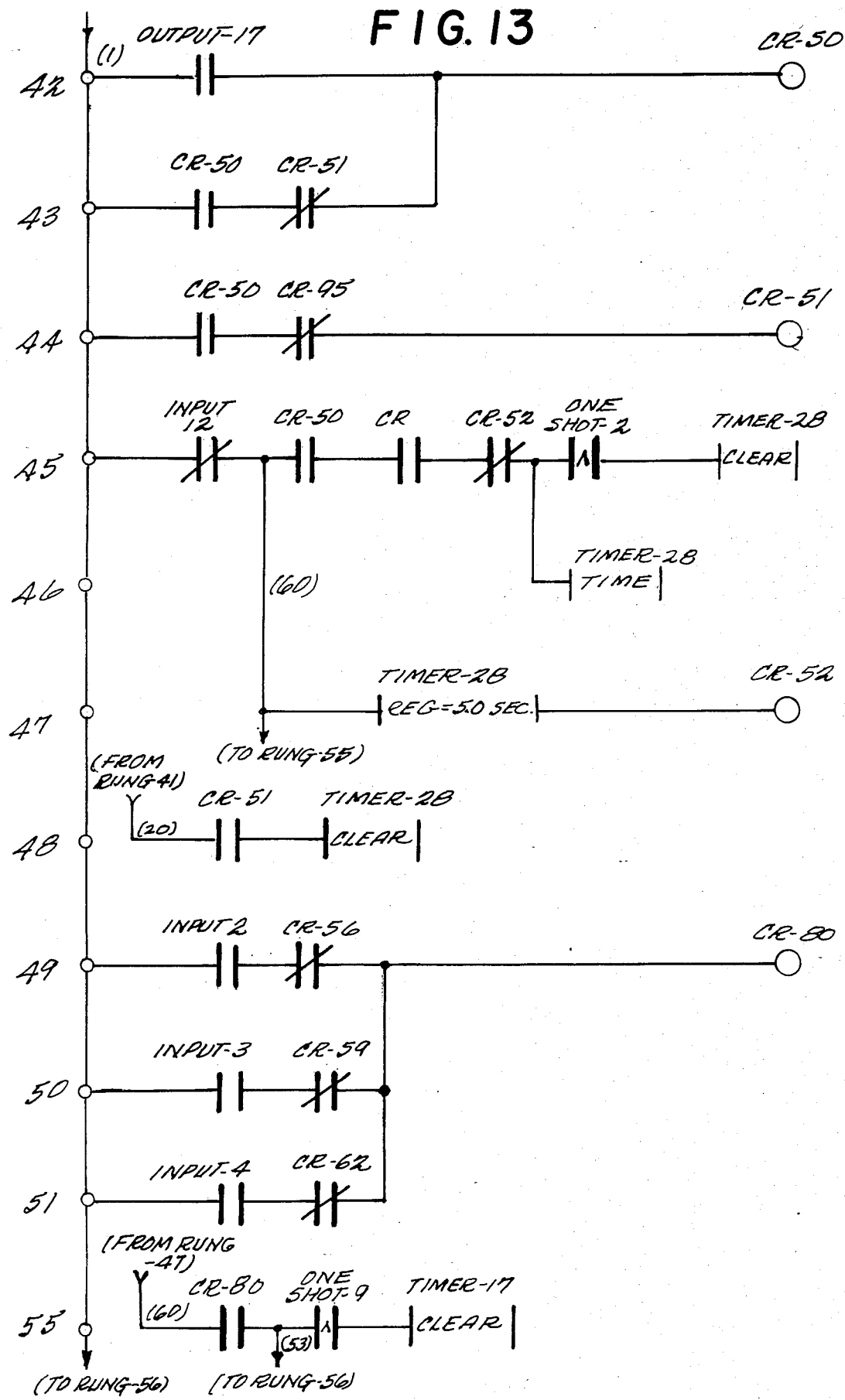
Figure 14:
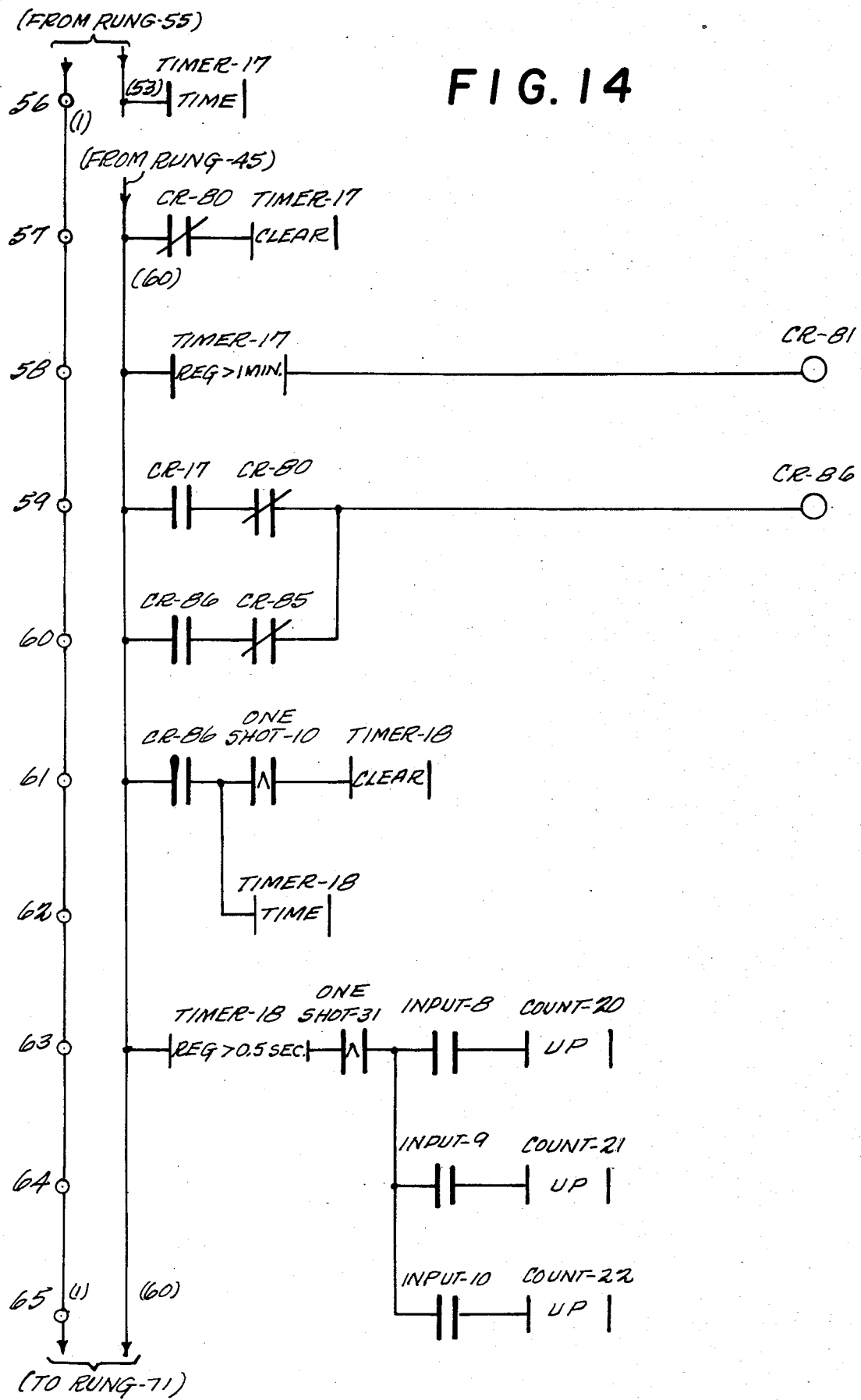

Turning now to FIG. 13, rungs 42-48 monitor for a bad dump. That is, 5.0 seconds after a dump has been initiated, if any pan 134 still has fibers weighing more than the set weight, it indicates that doors 136 for that feeder have not opened. As a result, an alarm is generated. To monitor for proper dumping, in rung 42, contacts associated with OUTPUT 17 close when programmable controller 118 generates OUTPUT 17 causing pans 134 to dump (see rung 163). Once the output signal has been generated, control latch 50, the dump latch, is energized. Once it has been energized, rung 43 keeps it energized until control relay 51, the dump reset latch, is energized.

At rung 44, control relay 95 is at set weight relay. It is energized as long as any feeder is at its set weight. Thus, in rung 44, contacts for control relay 95 close after a successful dump. Therefore, after the dump latch, CR50, causes contacts in rung 44 to close and the contacts of CR95 are closed after a dump, CR51, the dump reset latch, is energized. Rung 45 causes timer 28 to begin timing once a dump command has been given. Thus, when the contacts associated with INPUT 12 are closed, indicating that alarm bypass switch 208 has not been closed, control relay 50, the dump latch relay, is energized (see rung 42) closing its contacts, control relay 95, the at set weight relay is energized, closing its contacts (indicating that the dump has *not* been completed) and control relay 52, the bad dump relay is not energized so that its contacts are closed, one-shot 2 produces a pulse which clears timer 28. At the same time, timer 28 begins counting at rung 46. At rung 47, once timer 28 has counted 5.0 seconds, control relay 52, the bad dump relay, is energized. As will be explained later, the energizing of control relay 52 creates a system alarm. At rung 48, control relay 51 controls the clearing of timer 28. It will be recalled from rung 44 that control relay 51 is the dump reset latch. Thus, timer 28 is cleared after both a signal is output to initiate a dump and all of pans 134 have discharged their fibers.

Rungs 49-58 monitor the time necessary for filling pans 134 and generate an excessive fill time alarm if more than 60 seconds occur after filling is initiated without the set weight being reached. Control relay 80 in rung 49 is energized any time any feeder is filling its respective pan 134. Thus, in rung 49, the contacts associated with INPUT 2 close when feeder 100 has been selected and is filling. Control relay 56, energized at rung 5, maintains its contacts closed until 0.2 seconds after feeder 100 generates a full signal. Similarly, feeder 102 can energize control relay 80 at step 50. Feeder 104 can energize control relay 80 at rung 51.

At rung 55, once control relay 80 is energized, one-shot 9 produces a pulse to clear timer 17. At the same time, at rung 56 (see FIG. 14), timer 17 begins timing. Thus, timer 17 begins timing upon the beginning of filling of any of pans 134 and continues to time until all of pans 134 have been filled to their set weight. At rung 57, timer 17 is cleared once control relay 80 has been deenergized, indicating that all of pans 134 have been filled.

At rung 58, it is determined whether timer 17 has timed for one minute. If it has, control relay 81, the excessive fill time latch, is energized. As will be described below, energization of control relay 81 generates a system alarm.

Rungs 59-84 monitor for heavy dumps. As indicated above, a heavy dump occurs when any feeder dumps fiber weighing a preset value more than the desired set weight. In the preferred embodiment, when any feeder has three heavy dumps in a 10 minute period, a heavy dump alarm is generated. In rung 59, CR86, the post fill enable latch is set when the dump command, OUTPUT 17 is generated and control relay 80, the fill in progress latch, is not energized. In rung 60, as soon as control relay 86 is energized, the closing of the CR86 contacts insures that control relay 86 remains energized until control relay 85, the dump anti-bounce reset latch becomes energized. In step 61, once control relay 86 latch becomes energized, its contacts close so that one-shot 10 produces a pulse clearing timer 18 which then begins timing in rung 62.

Rung 63 determines whether timer 18 has timed for 0.5 seconds after filling is finished and the dump command has been issued. This 0.5 seconds allows fibers in weigh pan 134 to settle so that load cell 166 is producing an accurate indication of their weight. After the 0.5 seconds, one-shot 31 produces a pulse which is applied to contacts associated with INPUT 8. These contacts are closed only when programmable controller 118 is receiving a heavy dump indication from feeder 100. Thus, if feeder 100 has experienced a heavy dump, the contacts associated with INPUT 8 are closed so that the pulse from one-shot 31 is applied to counter 20 to increment its count. Thus, counter 20 totals the number of heavy dumps occurring in feeder 100. If feeder 100 has not experienced a heavy dump, then pulses from one-shot 31 are not applied to counter 20. The pulse from one-shot 31 is also applied in rungs 64 and 65 to counters 21 and 22 through contacts associated with INPUT 9 and INPUT 10. Counters 21 and 22 total the number of heavy dumps occurring in feeders 102 and 104, respectively.

As indicated above, when three heavy dumps occur in any feeder, a heavy dump alarm is generated. Rungs 71-73 in FIG. 15 cause this to occur. Rung 71 determines whether counter 20, associated with feeder 100, has incremented beyond 3. Rung 72 determines whether counter 21, associated with feeder 102, has incremented beyond 3. Rung 73 determines whether counter 22, associated with feeder 104 has incremented beyond 3. If any of these determinations are positive, heavy dump latch, CR83, becomes energized. As will be explained below, the energization of heavy dump latch 83 causes the generation of a system alarm.

As indicated above, timer 18, controlled in rungs 61-63 causes a 0.5 second time period to occur before load cells 166 are monitored to determine if any heavy dumps have occurred. It is obviously necessary to reset timer 18 after each dump. Accordingly, rung 79 in FIG. 15 clears timer 18. Control relay 85 is the dump anti-bounce reset relay. Its contacts close 5 seconds after the dump command is generated to clear timer 18.

As indicated above, a heavy dump alarm is generated only when three heavy dumps occur for any particular feeder in a 10 minute period. Counters 20-22 in rungs 63-65 count incidences of heavy dumps. Rungs 80-84 cause the 10 minute period to be monitored. Thus, in step 80, when the system is started with no alarms generated, one-shot 30 produces a pulse to clear timer 19. Then, as indicated in rung 81, timer 19 begins timing. In step 82, it is determined when timer 19 has timed for 10 minutes. When 10 minutes has elapsed, counter 20, associated with feeder 100, counter 21, associated with feeder 102, and counter 22, associated with feeder 104, are cleared in rungs 82, 83 and 84, respectively. Thus, after 10 minutes, if feeders 100, 102 and 104 have not produced more than 3 heavy dumps to create a heavy dump alarm in rungs 71-73, rungs 82-84 will clear these counters to begin counting during a new 10 minute period. Rung 170 in FIG. 19 causes timer 19 to be cleared once timer 19 has timed more than 10 minutes.

As indicated above, three status conditions are monitored in the preferred embodiment of this invention. If no dump occurs within 5 seconds after a dump command has been issued, no dump latch CR52 is set at rung 47. If more than 60 seconds pass from the beginning of a filling operation and any pan 134 is not yet at the set weight, excessive fill time latch, CR81 becomes energized in rung 58. If too many heavy dumps occur in a particular time period, heavy dump latch, CR83 becomes energized in rung 71. The energization of these relays causes contacts to close in rungs 85-87, respectively, which causes the production of a signal on OUTPUT 18 generating a system alarm. In rung 88, the generation of a system alarm causes contacts to close to maintain the alarm in effect even if the fault latches are reset. The alarm continues until INPUT 1, the blender on input, is no longer received, i.e., the system is shut off.

As long as the system has not started, it is necessary to keep a number of the timers and counters clear. Thus, at rung 89, as long as the blender is off, contacts associated with INPUT 1 are closed. This causes the indicated timers and counters to be cleared in rungs 89-118 in FIGS. 16 and 17.

In FIG. 13, rungs 44 and 45 need an indication of when any pan 134 has fibers which weigh the set weight. Thus, in rung 44, control relay 51, the dump reset latch must be energized after all pans 134 have dumped their load. At rung 45, timer 28, the dump timer which determines whether all pans dump in the allotted 5 seconds, is energized only when at least one pan 134 remains at its set weight. These functions are accomplished by at set weight latch, CR95. Thus, in rung 119 (FIG. 17), once the feeder 100 select latch is set, closing the contacts associated with CR55 and feeder 100 has reached the desired weight, causing the dropping of INPUT 2, closing the associated contacts, control relay 95 becomes energized. Rungs 120 and 121 control relay 95 in a similar fashion for feeders 102 and 104, respectively. Thus, control relay 95 is energized as long as any of feeders 100-104 have fibers in pan 134 at the set weight.

Turning now to FIG. 18, rungs 125-129 control the resetting of feeders 100-104 after a dump has occurred. In rung 125, the energization of dump reset latch, control relay 51, which occurs after pans 134 open, causes associated contacts to close, energizing feeder fill reset latch, control relay 90. At rung 126, once the dump latch, control relay 50, causes contacts to close energizing the dump anti-bounce latch, control relay 84. Once the dump anti-bounce latch control relay 84 is energized, contacts associated therewith close at rung 127 to maintain it latched until dump anti-bounce *reset* latch, control relay 85, is energized. The beginning of the dump, indicated by the closing of contacts associated with control relay 50 in step 126 causes one-shot 29 to produce a pulse at rung 127 to clear timer 29. At the same time, at rung 128, timer 29 begins timing. At rung 129, once timer 29 has timed 5.0 seconds, control relay 85, the dump anti-bounce *reset* latch is energized. Thus, after feeders open, 5.0 seconds must pass before a new filling cycle can begin. During these 5 seconds, any weight measurements are ignored due to the effect on weight measurements caused by trap doors 136 swinging open and closed. Thus, see rungs 3 (FIG. 10), 9 (FIG. 10) and 20 (FIG. 11) in which any feeder 100, 102 or 104 filled signal is ignored as a result of control relay 84.

Rungs 155-163 control the actual dumping. At rung 155, once dump cam switch 114 (see FIGS. 1 and 8) closes, indicating that conveyor 106 is in a proper position for a dump, contacts in rung 155 associated with INPUT 6 close. As long as a dump has not been completed, dump reset latch, control relay 93, has contacts which are closed, energizing post fill delay enable latch, control relay 91. Once control relay 91 is energized, it remains energized as a result of rung 156 until control relay 93, the dump reset latch, is energized. At step 157, once post fill delay enable relay 91 becomes energized, indicating that it is time for a dump, control relay 80 has contacts which remain close, indicating that all pans 134 are at set weight (see rung 49), and control relay 92 contacts are closed, indicating that a dump has not yet been enabled, one-shot 20 produces a pulse which clears timer 30 and at rung 158, timer 30 begins counting. At rung 159, when timer 30 has counted for 0.5 seconds, dump enable relay 92 is energized which, at rung 160 closes contacts to cause one-shot 21 to produce a pulse to clear dump duration timer 31. At rung 161, with the energizing of dump enable relay 92, timer 31 begins counting.

Figure 19:
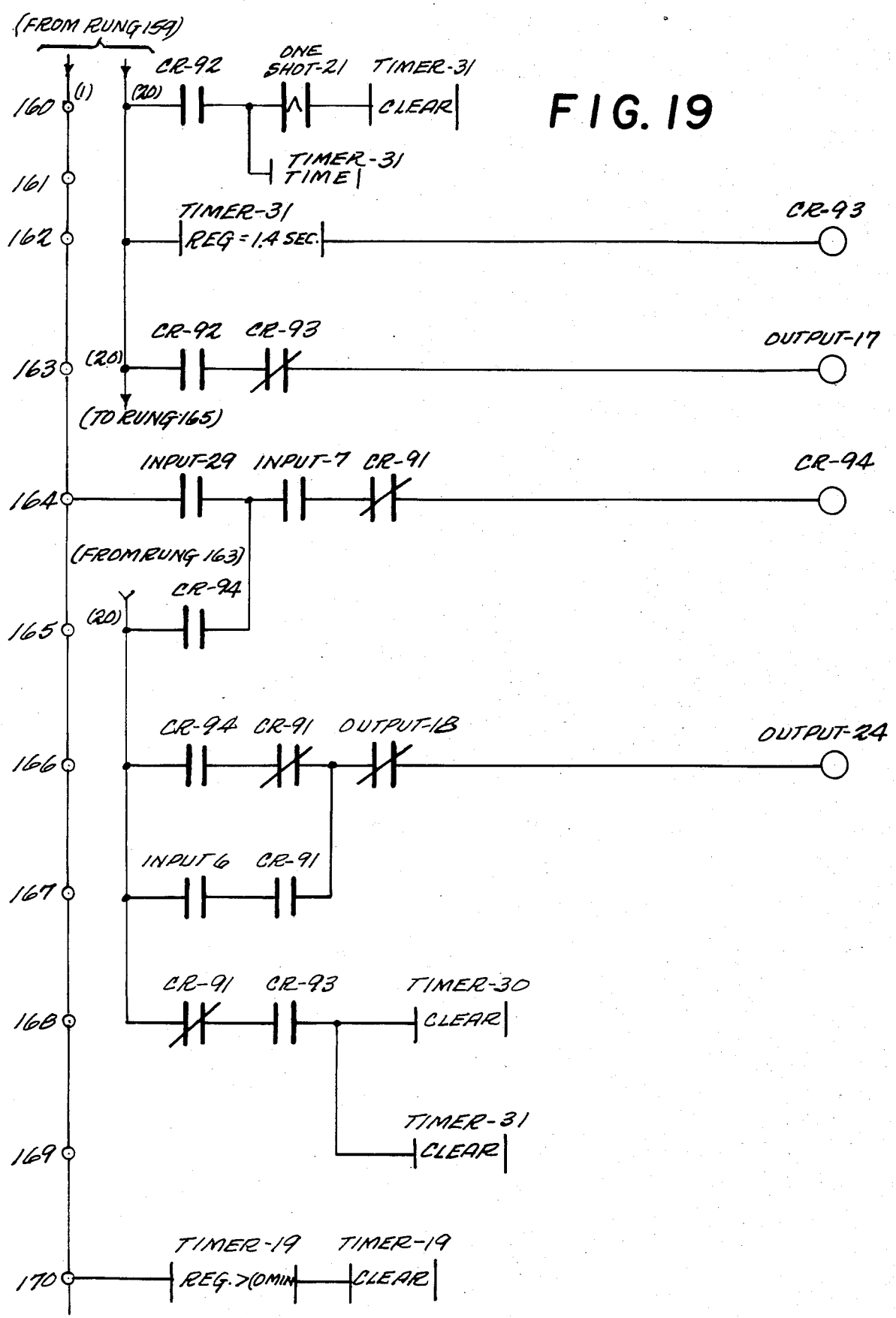

At rung 162 in FIG. 19, once timer 31 has timed for 1.4 seconds, dump reset relay, CR93 becomes energized. Rung 163 actually generates the dump command which causes trap doors 136 to open. Once dump enable latch, control relay 92 is energized and until dump reset latch, control relay 93 becomes energized, the dump command is generated on OUTPUT 17. Thus, as controlled by rungs 157-159, after all of pans 134 are full, timer 30 causes the system to wait 0.5 seconds before control relay 92 is energized which causes the dump command to be generated at rung 163. Once control relay 92 has been energized, rungs 160-162 cause timer 31 to measure 1.4 seconds before rung 163 stops generation of the dump command signal. Thus, trap doors 136 remain open for 1.4 seconds.

Programmable controller 118 also controls conveyor 106 in response to the demand for blended fibers as determined by the electric eye downstream of blender 116. Thus, at rung 164, when a signal is received at INPUT 29 from the electric eye, contacts close. If, at that time, the system is enabled, closing contacts associated with INPUT 7, and the post-fill delay latch, control relay 91, is deenergized, closing its contacts, process demand latch, control relay 94, is energized. Rung 165 causes process demand latch, control relay 94, to remain energized until the system is disabled or the system is in the post-fill delay.

Rung 166 generates a command to cause conveyor 106 to begin operation. Thus, if process demand latch, control relay 94, has been energized, closing its associated contacts, the post-fill delay enable latch, control relay 91, is not energized, so that its associated contacts are closed and system alarm OUTPUT 18 is not being energized, so that its contacts are closed, a command is generated on OUTPUT 24. As a result, conveyor 106 will continue operation until the dump cam switch 114 closes indicating proper conveyor position (see FIG. 18 rungs 155 and 156) and at that time CR91 energizes opening its contacts and disabling OUTPUT 24 to stop the conveyor.

If it should happen that conveyor 106 stops so that dump command switch 114 is resting upon cam 112 (see FIG. 1), it is necessary to move conveyor 106 a bit to change this situation. Accordingly, at rung 167, a signal is generated at OUTPUT 24 when a signal is received from switch 114 on input terminal 6 and post fill delay latch, control relay 91, is energized.

At rung 168, once post fill delay latch, control relay 91, is deenergized and a dump reset latch, control relay 93, is energized, timers 30 (rung 168) and 31 (rung 169) are cleared. It will be recalled that timer 30 produced a 0.5 second delay after all pans 134 were full before doors 136 opened (see rungs 157-159). Timer 31 maintains doors 136 open for 1.4 seconds during a dump (see rungs 160-163).

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. Fiber weighing apparatus comprising:
 a pan;
 means for filling said pan with fibers;
 means for emptying said pan when the weight of fibers in said pan exceeds a predetermined value;
 means for generating an excessive fill time signal when a first predetermined time occurs from the beginning of filling without said pan being emptied; and
 means for maintaining said excessive fill time signal until said filling means and emptying means are deactivated.

2. Fiber weighing apparatus comprising:
 a pan;
 means for filling said pan with fibers;
 means for generating a weight signal related to the weight of fibers in said pan;
 means for stopping filling in response to a stop signal; and
 processing means for: (1) generating said stop signal when said weight signal achieves a predetermined value, (2) generating an excessive fill time signal when a predetermined time occurs from the beginning of filling without said stop signal being generated, and (3) maintaining said excessive fill time signal until said filling means and stopping means are deactivated.

3. Apparatus as in claim 2 wherein:
 said apparatus further includes means for emptying said pan in response to a dump signal; and
 said processing means generates a no dump signal when another predetermined time passes after said dump signal with said weight signal no less than said predetermined value, and a heavy dump signal when said weight signal exceeds another predetermined value greater than said predetermined value more than a predetermined number of times.

4. Apparatus as in claim 2 further comprising means for generating an alarm bypass signal, said processing means preventing generating of said excessive fill time signal in response to said alarm bypass signal.

5. Apparatus as in claim 2 wherein said apparatus includes a single generating means.

6. Apparatus as in claim 5 further comprising:
 first supporting means for supporting a first end of said pan;
 second supporting means for supporting a second end of said pan;
 a wire connecting said generating means to said pan, said generating means generating said weight signal in response to the force applied by said wire;
 a tube disposed about said wire; and
 means, disposed in said tube, for damping vibrations in said wire.

7. Apparatus as in claim 6 wherein said generating means includes a load cell.

8. Apparatus as in claim 6 further comprising:
 a housing, said filling means being disposed in said housing and said first and second supporting means being attached to said housing; and means for mounting said generating means on, but displaced from, said housing.

9. Apparatus as in claim 6 wherein said tube includes a soft plastic tube and said damping means includes silicone rubber.

10. Apparatus as in claim 2 further comprising means for selectively displaying one of an indication of said weight signal and an indication of said first predetermined value.

11. Fiber weighing apparatus comprising:
a pan;
means for filling said pan with fibers;
means for generating a weight signal related to the weight of fibers in said pan;
means for emptying said pan in response to a dump signal; and
processing means for: (1) generating said dump signal at a time after said weight signal achieves a predetermined value, and (2) generating a no dump signal when a predetermined time passes after said dump signal with said weight signal no less than said predetermined value.

12. Apparatus as in claim 11 further comprising means for generating an alarm bypass signal, said processing means preventing generating of said no dump signal in response to said alarm bypass signal.

13. Apparatus as in claim 11 wherein said apparatus includes a single one of said generating means.

14. Apparatus as in claim 13 further comprising:
a pivotal support connected to said pan;
means, connected to said support for counterbalancing the weight of said pan; and
means for connecting said generating means to a first end of said pan.

15. Apparatus as in claim 14 wherein said generating means includes a load cell.

16. Apparatus as in claim 14 further comprising:
a housing, said support being pivotally attached to said housing; and
means for mounting said generating means on, but displaced from, said housing.

17. Apparatus as in claim 14 further comprising means for damping vibrations in said connecting means.

18. Apparatus as in claim 17 wherein said damping means includes:
a soft plastic tube disposed about said connecting means; and
silicone rubber disposed in said tube.

19. Fiber weighing apparatus comprising:
a pan;
means for filling said pan with fibers;
means for generating a weight signal related to the weight of fibers in said pan;
means for emptying said pan in response to a dump signal; and
processing means for: (1) generating said dump signal at a time after said weight signal achieves a first predetermined value, (2) measuring a plurality of predetermined time intervals, and (3) generating a heavy dump signal when said weight signal exceeds a second predetermined value greater than said first predetermined value more than a predetermined number of times in any of said time intervals.

20. Apparatus as in claim 19 further comprising means for generating an alarm bypass signal, said processing means preventing generation of said heavy dump signal in response to said alarm bypass signal.

21. Apparatus as in claim 19 wherein said apparatus includes a single one of said generating means.

22. Apparatus as in claim 21 further comprising:
a housing;
a support having first and second portions pivotally attached to said housing;
means for connecting said pan to said first and second support portions;
means for counterbalancing the weight of said pan on said support;
means for mounting said generating means on, but displaced from, said housing;
a wire connecting said generating means to said pan first end;
a tube disposed about said wire;
a pliable material disposed in said tube; and
means for stopping filling in response to said weight signal.

23. Apparatus as in claim 22 wherein said tube includes a soft plastic tube and said pliable material include silicone rubber.

24. Apparatus as in claim 22 wherein said processing means causes said stopping means to stop filling only after said generating means produces said weight signal having at least said first predetermined value for at least a predetermined time.

25. Apparatus as in claim 22 wherein:
said stopping means stops filling in response to a stop signal; and
said processing means also: (1) generates said stop signal when said weight signal achieves a first predetermined value, (2) generates an excess fill time signal when a first predetermined time occurs from the beginning of filling without said stop signal being generated, and (3) generates a no dump signal when a second predetermined time passes after said dump signal with said weight signal no less than said first predetermined value.

26. Apparatus as in claim 25 further comprising means for generating an alarm bypass signal, said processing means preventing generation of said excessive fill time signal, said no dump signal and said heavy dump signal in response to said alarm bypass signal.

27. Apparatus as in claim 25 wherein said processing means generates said stop signal only after said weight signal has achieved said first predetermined value for at least a first predetermined period and said processing means waits at least a second predetermined period after said weight signal achieves said first predetermined value before determining whether said weight signal exceeds said second predetermined value.

28. Apparatus as in claim 22 wherein said generating means includes a load cell.

29. Apparatus as in claim 19 wherein said processing means waits a predetermined time after said weight signal achieves said first predetermined value before determining whether said weight signal exceeds said second predetermined value.

30. Apparatus as in claim 19 further comprising means for selectively displaying one of an indication of said weight signal, an indication of said first predetermined value of an indication of said second predetermined value.

31. Fiber weighing apparatus comprising:
a pan;
means for filling said pan with fibers;
means for generating a weight signal related to the weight of fibers in said pan;

means for stopping filling in response to a stop signal;

means for emptying said pan in response to a dump signal;

means for generating an alarm bypass signal; and processing means for: (1) generating said stop signal when said weight signal achieves a first predetermined value, (2) generating an excessive fill time signal when a first predetermined time occurs from the beginning of filling without said stop signal being generated, (3) maintaining said excessive fill time signal until said filling means, said stopping means and said emptying means are deactivated, (4) generating a no dump signal when a second predetermined time passes after said dump signal with said weight signal no less than said first predetermined value, (5) measuring a plurality of predetermined time intervals, (6) generating a heavy dump signal when said weight signal exceeds a second predetermined value greater than said first predetermined value more than a predetermined number of times in any of said time intervals, and (7) preventing generation of said excessive fill time signal, said no dump signal and said heavy dump signal in response to said alarm bypass signal.

32. Apparatus as in claim 31 wherein said processing means waits a third predetermined time after said weight signal achieves said first predetermined value before determining whether said weight signal exceeds said second predetermined value.

33. Apparatus as in claim 32 wherein said apparatus includes a single one of said generating means.

34. Apparatus as in claim 33 further comprising:

a housing;

a support attached to said pan and pivotally attached to said housing;

means, attached to said support, for counterbalancing the weight of said pan; and means for mounting said generating means on, but displaced from, said housing.

35. Apparatus as in claim 34 further comprising:

a wire connecting said pan to said generating means;

a tube disposed about said wire; and pliant material disposed in said tube.

36. Apparatus as in claim 35 wherein said tube includes a soft plastic tube and said pliant material includes silicone rubber.

37. Apparatus as in claim 36 further comprising means for selectively displaying one of an indication of said weight signal, an indication of said first predetermined value and an indication of said second predetermined value.

38. Apparatus as in claim 1 wherein said emptying means comprises:

a single means for generating a weight signal in relation to the force applied to said generating means;

means for connecting said generating means to said pan, said generating means generating said weight signal in response to the force applied by said connecting means; and means for stopping filling in response to said weight signal.

39. Apparatus as in claim 38 wherein said single generating means includes a single load cell.

40. Apparatus as in claim 38 further comprising:

a housing, said filling means being disposed in said housing;

first and second supporting means, attached to said housing, for supporting ends of said pan; and means for mounting said generating means on, but displaced from, said housing.

41. Apparatus as in claim 38 wherein said connecting means applies said force to said generating means in a single direction and includes means for damping vibrations in said connecting means.

42. Apparatus as in claim 38 further comprising means for continuously displaying an indication of said weight signal.

43. Apparatus as in claim 38 wherein said stopping means stops filling said pan only after said generating means produces said weight signal having at least a predetermined value for at least a predetermined time.

* * * * *